United States Patent
Isaji et al.

[11] Patent Number: 5,906,395
[45] Date of Patent: May 25, 1999

[54] AIR BAG APPARATUS, FOLDED AIR BAG, AND METHOD OF FOLDING THE AIR BAG

[75] Inventors: Kazuyoshi Isaji, Kariya; Toshiaki Matsuhashi, Gamagori; Yutaka Ohashi, Handa; Kiyoshi Sugimura, Toyoake; Shigenori Kobayashi, Hazu-gun, all of Japan

[73] Assignee: Denso Corporation, Kariya, Japan

[21] Appl. No.: 08/898,679

[22] Filed: Jul. 22, 1997

[30] Foreign Application Priority Data

| Jul. 24, 1996 | [JP] | Japan | 8-194993 |
| Jul. 24, 1996 | [JP] | Japan | 8-194995 |
| Sep. 12, 1996 | [JP] | Japan | 8-242183 |
| Jan. 10, 1997 | [JP] | Japan | 9-003327 |
| Jan. 27, 1997 | [JP] | Japan | 9-012639 |
| Feb. 4, 1997 | [JP] | Japan | 9-021734 |
| Mar. 17, 1997 | [JP] | Japan | 9-063243 |

[51] Int. Cl.$^6$ ............................................ B60R 21/16
[52] U.S. Cl. .................... 280/743.1; 280/730.2; 280/728.2
[58] Field of Search ................. 280/743.1, 728.2, 280/730.2

[56] References Cited

U.S. PATENT DOCUMENTS

| 5,140,799 | 8/1992 | Satoh | 280/743.1 |
| 5,320,380 | 6/1994 | Hamada et al. | 280/728.3 |
| 5,348,341 | 9/1994 | Webber | 280/743.1 |
| 5,419,579 | 5/1995 | McPherson et al. | 280/743.1 |
| 5,425,552 | 6/1995 | Linder | 280/743.1 |
| 5,490,690 | 2/1996 | Mihm | 280/728.2 |
| 5,520,408 | 5/1996 | Niederman | 280/743.1 |
| 5,570,900 | 11/1996 | Brown | 280/743.1 |

FOREIGN PATENT DOCUMENTS

| 5-162598 | 6/1993 | Japan . |
| 7-228213 | 8/1995 | Japan . |
| 8-258659 | 10/1996 | Japan . |

*Primary Examiner*—Kenneth R. Rice
*Attorney, Agent, or Firm*—Pillsbury Madison & Sutro LLP

[57] ABSTRACT

An air bag is folded in such a manner that a first fold-portion of the air bag is folded along a first fold-line approximately parallel to an expanding direction, and then, a second fold-portion thereof is folded along a second fold-line approximately perpendicular to the expanding direction. Accordingly, when the air bag expands, the second fold-portion is stretched out prior to the first fold-portion. As a result, the air bag can expand promptly to securely protect a passenger.

60 Claims, 28 Drawing Sheets

AIR BAG APPARATUS, FOLDED AIR BAG, AND METHOD OF FOLDING THE AIR BAG

CROSS REFERENCE TO RELATED APPLICATIONS

This application is based upon and claims the benefit of priority of the prior Japanese Patent Applications No. 8-194993 filed on Jul. 24, 1996, NO. 8-194995 filed on Jul. 24, 1996, NO. 8-242183, filed on Sep. 12, 1996, NO-9-3327, filed on Jan. 10, 1996, NO. 9-12639, filed on Jan. 27, 1997, NO. 9-21734, filed on Feb. 4, 1997, and NO. 9-63243, filed on Mar. 17, 1997, the contents of which are incorporated herein by reference.

BACKGROUND OF THE INVENTION

1. Field of the Invention

The present invention relates to a side protecting type air bag apparatus for a vehicle, and a method of folding the air bag installed therein.

2. Related Arts

One example of a conventional side protecting type air bag apparatus is disclosed in JP-A-5-162598. In this air bag apparatus, an air bag is installed in a state where a vertically expanding portion thereof is folded in a form of bellows and is temporarily fixed to a horizontally expanding portion thereof by temporary fixing threads. Accordingly, the horizontally expanding portion of the air bag initially expands. After the horizontally expanding portion of the air bag is expanded to a certain degree, the temporary fixing threads are broken. As a result, the vertically expanding portion of the air bag is allowed to expand upward. However, because the vertically expanding portion expands after the temporary fixing threads are broken, the rapidity of the expansion of the air bag is not sufficient. In addition, a process for temporarily fixing the folded vertically expanding portion is needed, thereby giving rise to high cost.

SUMMARY OF THE INVENTION

The present invention has been made in view of the above-mentioned problems and an object of the present invention is to provide a side protecting type air bag apparatus capable of expanding promptly to securely protect a passenger and a method of folding an air bag installed in the air bag apparatus at low cost.

According to the present invention, an air bag to be installed in a case has a fixed portion to be fixed to the case and a tip portion opposite to the fixed portion in an expanded state. To fold the air bag, firstly, a first fold-portion of the air bag is folded along a first fold-line. The first fold-line is approximately parallel to a center line which connects the fixed portion and the tip portion. Thereafter, a second fold-portion including the tip portion is folded along a second fold-line approximately perpendicular to the center line.

Accordingly, when the air bag expands, the second fold-portion expands prior to the first fold-portion. Therefore, the expanding direction of the air bag can be determined promptly to be a required direction to protect a passenger securely. Further, the air bag is simply folded with the first and second fold-portions without performing an extra provisional fixation or the like, thereby resulting in low cost.

The air bag may be further folded toward the fixed portion along fold-lines approximately parallel to the second fold-line, after folding the second fold-portion. The air bag may be repeatedly folded in a reverse direction relative to a direction in which the air bag is folded just before, after folding the second fold-portion. As a result, the air can expand more promptly.

The air bag can have a third fold-portion opposite to the first fold-portion and folded along a third fold-portion approximately parallel to the center line. In this case, it is desired that the third fold-portion is folded not to overlap on the first fold-portion, so that the thickness of the folded air bag is not increased. Further, in a case where the first and third fold portions are folded inside of the air bag, the thickness of the folded air bag can be decreased.

BRIEF DESCRIPTION OF THE DRAWINGS

Other objects and features of the present invention will become more readily apparent from a better understanding of the preferred embodiments described below with reference to the following drawings.

DETAILED DESCRIPTION OF THE PREFERRED EMBODIMENTS

Embodiments according to the present invention will be described hereinunder with reference to the drawings.

First Embodiment

Figure 1:
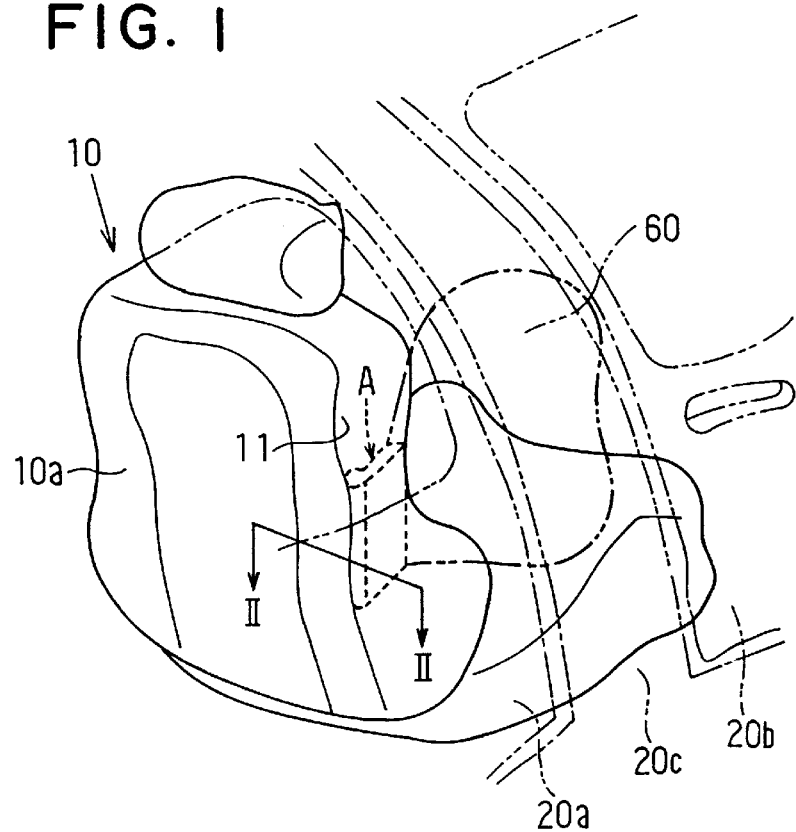
FIG. 1 is a perspective view showing an air bag apparatus installed within a right side wall of a backrest of a driver's seat in a first embodiment according to the present invention.

In a first embodiment, as shown in FIG. 1, a side protecting type air bag apparatus A is installed in a right side wall 11 of a backrest 10a of the driver's seat, approximately at a middle position of the right side wall 11 in a vertical direction. The right side wall 11 of the backrest 10a of the driver's seat faces a right side rear door 20a and a door pillar 20c. The door pillar 20c is provided between the right side rear door 20a and a right side front door 20b.

Figure 2:
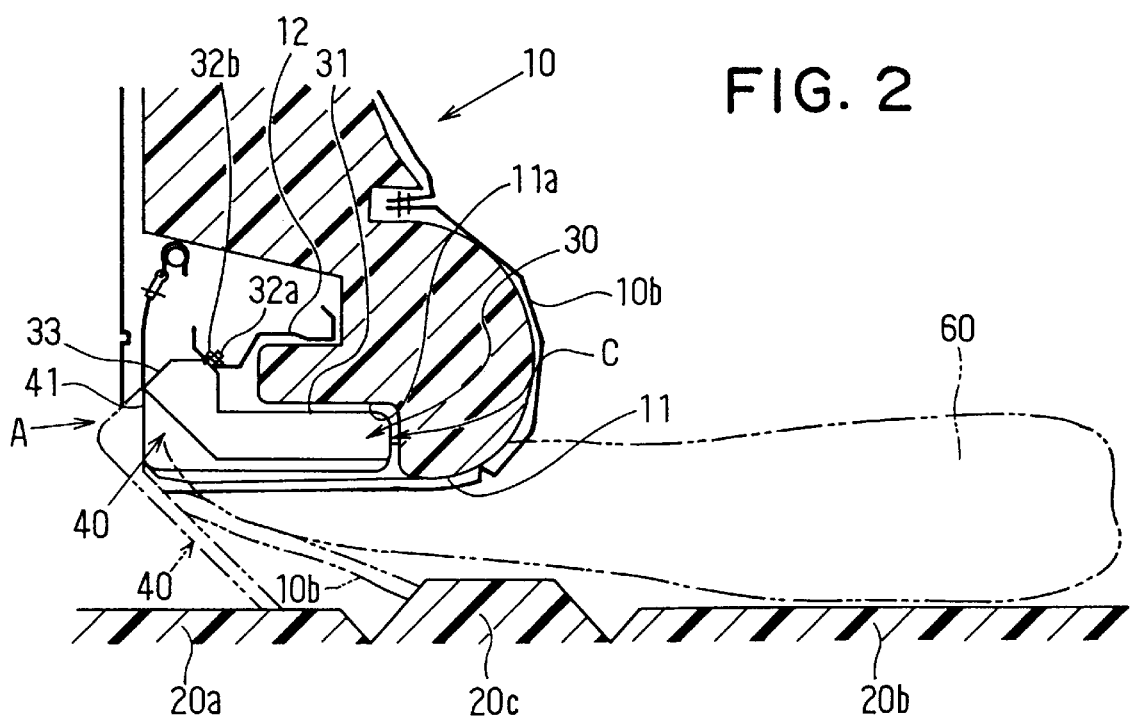
FIG. 2 is a partly enlarged cross-sectional view along a II—II line in FIG. 1.
Figure 3:
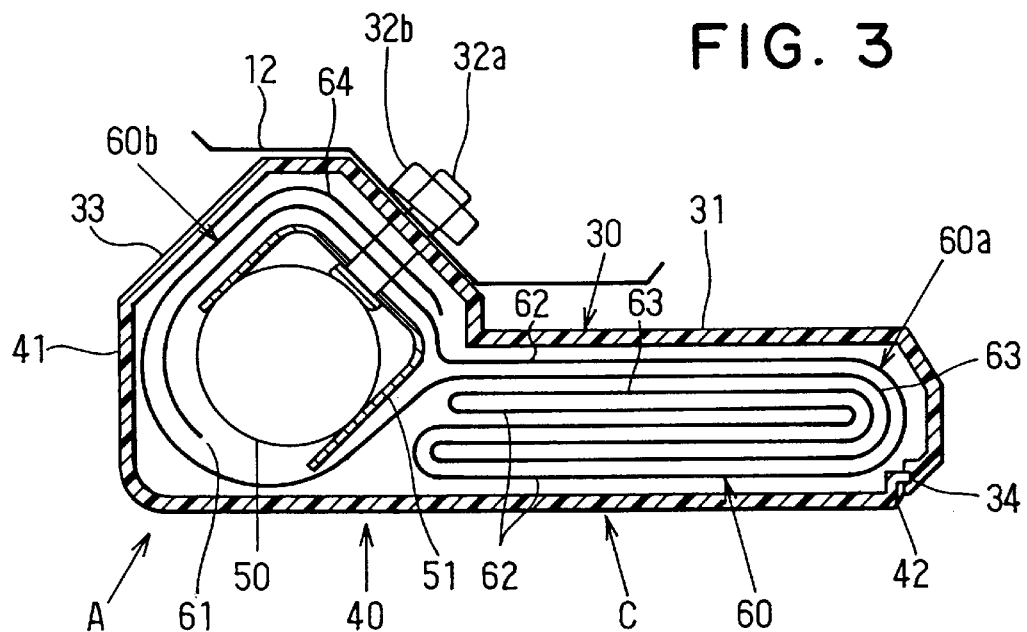
FIG. 3 is a cross-sectional view showing the air bag apparatus in the first embodiment.

The air bag apparatus A has a casing C shown in FIGS. 2 and 3. The casing C is composed of a casing member 30 and a cover member 40, which are made of elastic synthetic resin material (for example, olefin family thermoplastic elastomer), and are integrally formed to have a generally L-shaped crosssection. The casing C is covered by a skin 10b of the backrest 10a in the state where the air bag apparatus A is installed in the right side wall 11 of the backrest 10a. The casing member 30 is held within a recess 11a formed in the right side wall 11 of the backrest 10a so that a bottom wall 31 thereof faces the recess 11. The bottom wall 31 of the casing member 30 is fixed to a frame 12 disposed within the backrest 10a, by tightening bolts 32a and nuts 32b.

The thickness of the cover member 40 is thinner than that of the casing member 30 so that the cover member 40 becomes flexible. The cover member 40 is hinged to a back wall 33 of the casing member 30 at a back end 41 thereof to enable to be opened and to be closed. The cover member 40 further has a crank-like engaging portion 42 at a front end thereof, and the engaging portion 42 is associated with a groove 34 formed at an end of the casing member 30 in a state capable of engaging and disengaging (refer to FIG. 3).

An inflator 50 having a retainer 51 is installed in an air bag 60 through an opening of the air bag 60 described later, and is installed within the casing member 30 as shown in FIG. 3. The inflator 50 is fixed to the above mentioned frame 12 of the back rest 10a with the retainer 51 and the bottom wall 31 of the casing member 30 by tightening the bolts 32a and the nuts 32b so that the axial direction of the inflator 50 is parallel to the vertical direction of the backrest 10a.

Figure 4:
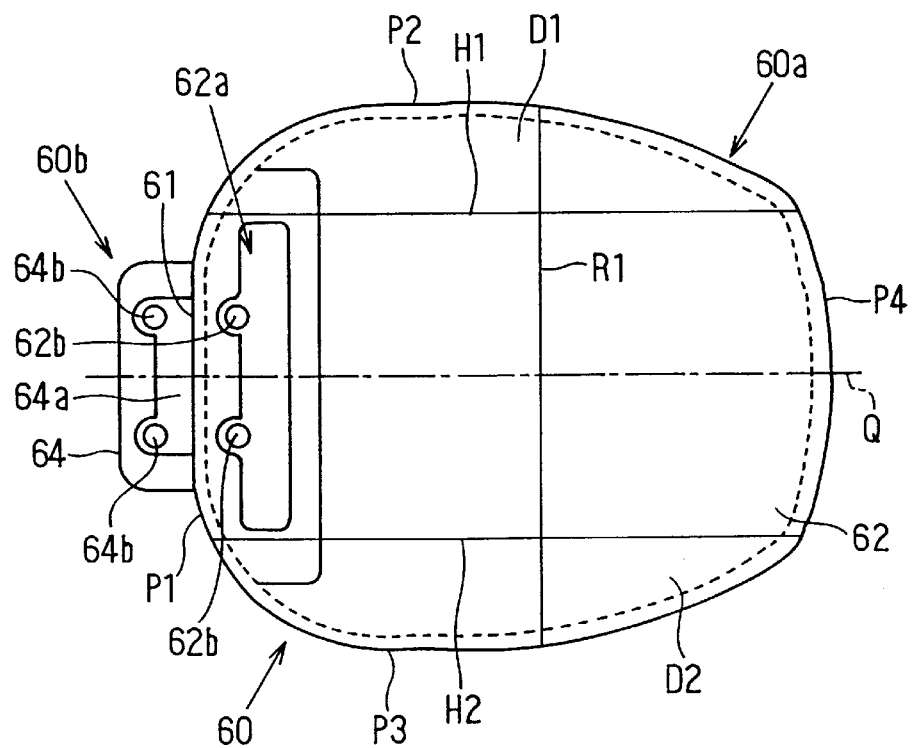
FIG. 4 is a plan view showing an air bag of the air bag apparatus in the first embodiment.

The air bag 60 is, as shown in FIG. 4, composed of an air bag body 60a having a generally square shape and a tongue portion 60b, which are integrally formed by fabric. The air bag body 60a has an upper fabric member 62 and a lower fabric member 63 (refer to FIGS. 3, 4 and 5), which are sewed together along those outer circumferences into a bag-like shape to have the above-mentioned opening 61 on an outer side P1. The tongue portion 60b is integrally formed with the lower fabric member 63 to extend on the outer side P1. The margins sewed along the outer circumferences of the upper and lower fabric members 62 and 63 are positioned inside of the air bag body 60a.

On the inner face of the upper fabric member 62 adjacent to the opening 61, a reinforcement fabric is disposed to be sewed, thereby forming a reinforcement portion 62a. The tongue portion 60b also has a reinforcement portion 64a formed on an overlapped portion 64 which is overlapped on the reinforcement portion 62a of the upper fabric member 62 when installed. The reinforcement portion 64a is formed by sewing a reinforcement fabric on the inner face of the overlapped portion 64 of the tongue portion 60b. The reinforcement portions 62a and 64a of the upper fabric member 62 and the tongue portion 60b have through holes 62b and 64b, respectively, which are to be penetrated by the bolts 32a.

In a state where the air bag 60 holds the inflator 50, the tongue portion 60b extends along the retainer 51 of the inflator 50. The overlapped portion 64 of the tongue portion 60b is overlapped on the upper fabric member 62 from the outside so that the through holes 64b thereof correspond to the through holes 62b of the upper fabric member 62. In this state, each of the bolts 32a projecting from the retainer 51 is inserted into the through holes 64b and 62b of the overlapped portion 64 and the upper fabric members 62. The bolts 32a further penetrate the bottom wall 31 of the casing member 30 to be tightened by the nuts 32b, so that the air bag 60 and the retainer 51 are fixed to the frame 12.

In the first embodiment, synthetic fiber such as nylon, polyester or the like, vegetable fiber, animal fiber or the like can be employed as the fabric of the air bag body 60a and the tongue portion 60b, and as the reinforcement fabric.

Next, a method of folding up the air bag 60 will be explained by referring to FIGS. 4 to 7. Here, in FIGS. 4 to 7, the air bag 60 is turned over so that the lower fabric member 63 is on an upper side in the figures. Firstly, as shown in FIG. 4, fold-lines H1 and H2 are determined as references for folding the air bag body 60a, in parallel with a center line Q of the air bag body 60a. Accordingly, outside parallel fold-portions D1 and D2 of the air bag body 60a, having outer sides P2 and P3 respectively are defined. The fold-portions D1 and D2 are folded toward the center portion of the lower fabric member 63 using the fold-lines H1 and H2 as the references. In this case, each width of the parallel fold-portions D1 and D2 is determined not to be overlapped on each other when folded.

Figure 5:
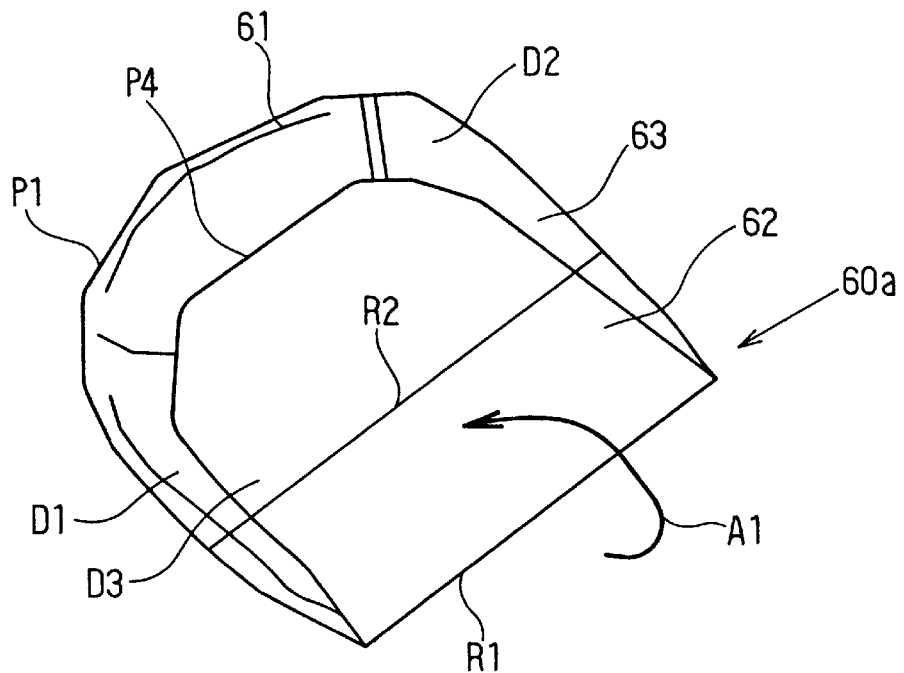
FIGS. 5 to 7 are perspective views showing a folded state of the air bag in the first embodiment.

Next, a fold-line R1 perpendicular to the center line Q is determined as a reference as shown in FIG. 4, thereby defining a perpendicular fold-portion D3 having an outer side P4 opposite to the outer side P1. The perpendicular fold-portion D3 is folded toward the lower fabric member 63 along with the folded parallel fold-portions D1 and D2 in a direction indicated by an arrow A1 in FIG. 5. After folding the fold-portions D1, D2, and D3, as shown in FIG. 5, a fold-line R2 perpendicular to the center line Q is further determined as a reference, thereby defining a perpendicular fold-portion D4. An end portion of the fold-portion D4 corresponds to the fold-line R1. The fold-portion D4 is folded toward the outer side P1 in a direction indicated by an arrow A2 in FIG. 6. Moreover, a fold-line R3 perpendicular to the center line Q is determined as a reference, thereby defining a perpendicular fold-portion D5. An end portion of the fold-portion D5 corresponds to the fold-line R2. The fold-portion D5 is folded in the same way as the fold-portion D4 in a direction indicated by an arrow A3 in FIG. 7. Accordingly, the air bag 60 is folded up in a finally folded state to be installed in the casing C as shown in FIG. 3. Each width between the fold-lines R1 and R2, and R2 and R3 is chosen to be a specific width.

In the air bag apparatus receiving thus folded air bag 60, the inflator 50 generates gas upon detecting an impact against the front door 20b of the vehicle, and the air bag 60 starts to expand by the gas supplied from the inflater 50. Accordingly, the cover member 40 of the casing C starts to open with the hinged portion functioning as a rotating axis.

Figure 6:
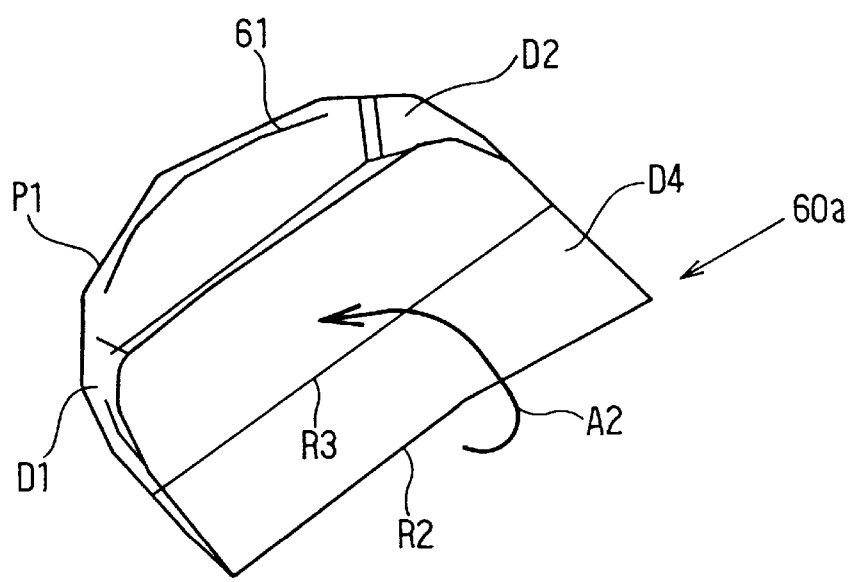
Figure 7:
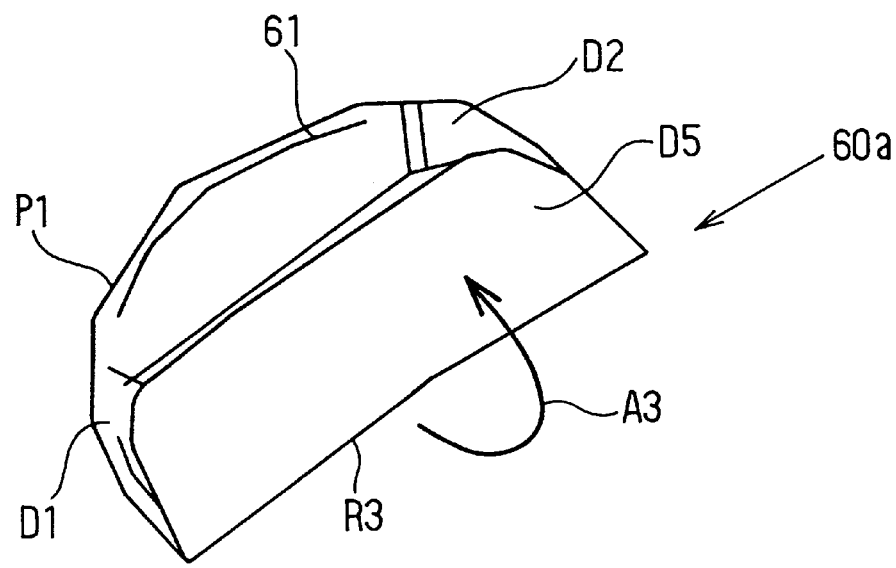
Figure 8:
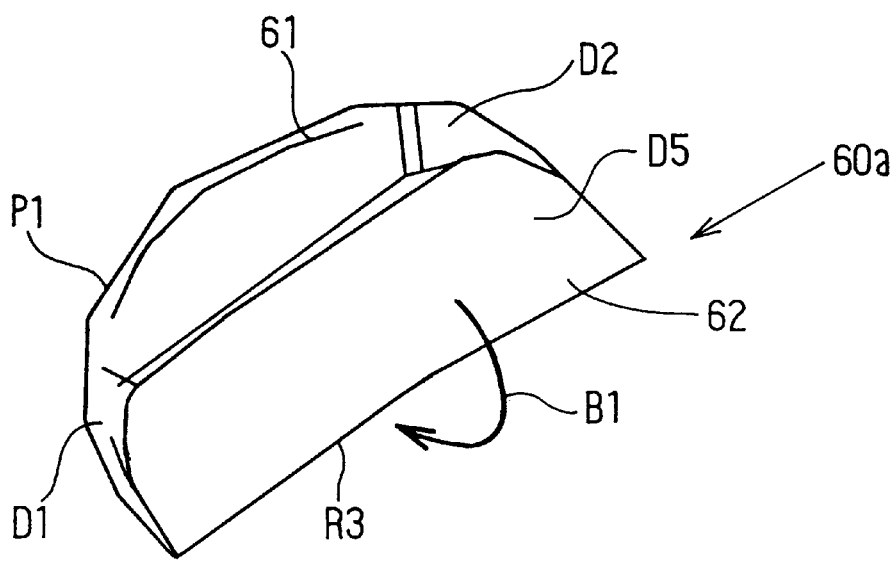
FIGS. 8 to 11 are perspective views showing an expanded state of the air bag in the first embodiment.
Figure 9:
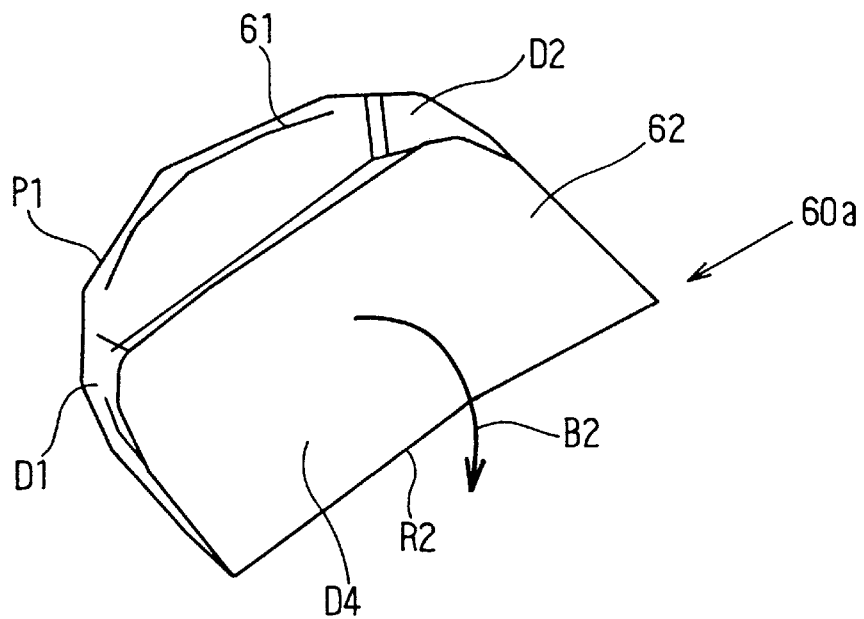
Figure 10:
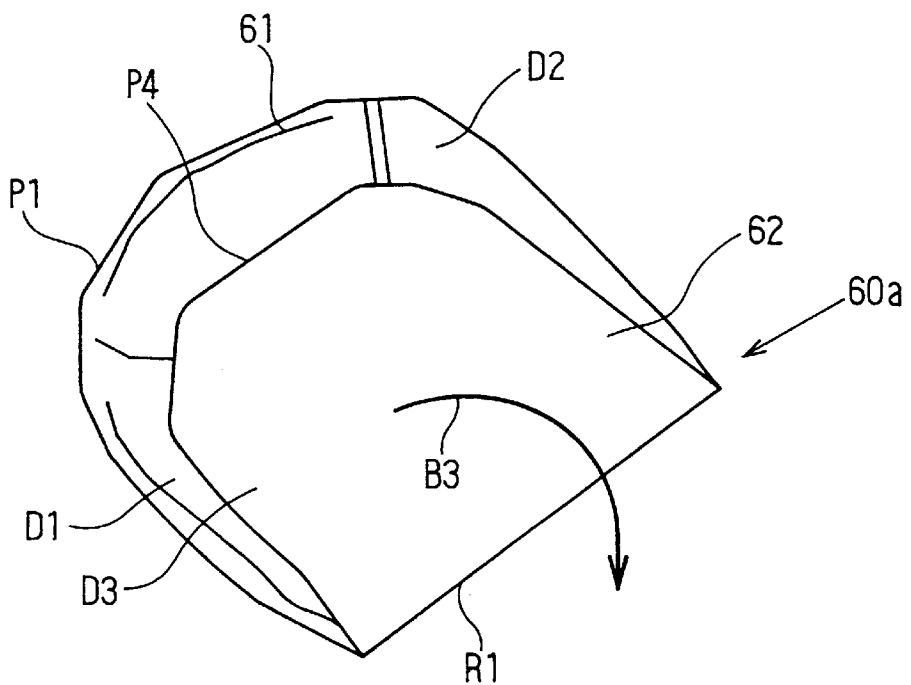
Figure 11:
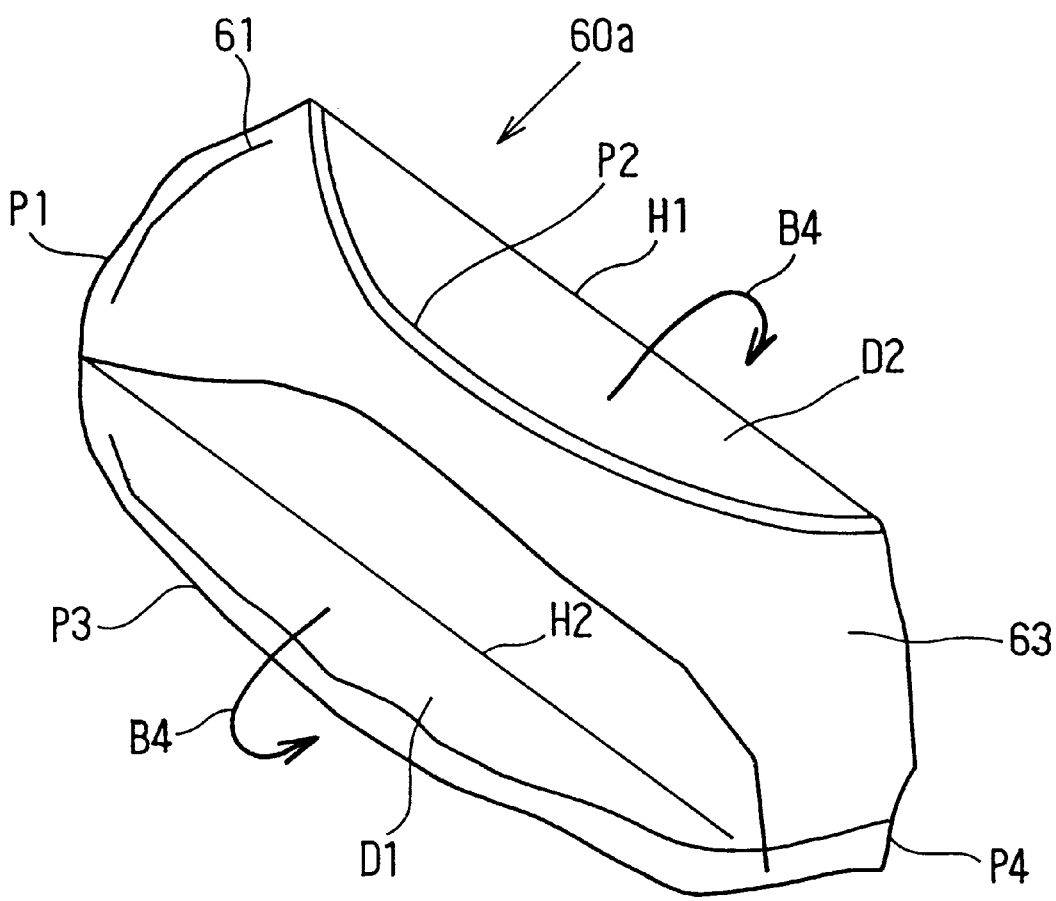

When the air bag 60 folded in the state shown in FIG. 8 expands, in the first embodiment, the fold-portion D5 is firstly stretched out using the fold-line R3 as the reference in a direction indicated by an arrow B1 shown in FIG. 8, so that the air bag 60 changes into a folded state shown in FIG. 9, which is corresponding to the folded state shown in FIG. 6. Subsequently, the fold-portion D4 is stretched out in a direction indicated by an arrow B2 shown in FIG. 9, so that the air bag 60 changes into a folded state shown in FIG. 10, which corresponds to the state shown in FIG. 5. The air bag 60 further expands so that the fold-portion D3 is stretched out in a direction indicated by an arrow B3 shown in FIG. 10 using the fold-line R1 as the reference, so that the air bag 60 changes into the state where only the parallel fold-portions D1 and D2 have been folded. That is, the air bag body 60a is in a state where the expansion thereof in a direction of the outer side P4 (in a front direction with respect to the casing C) has finished. Thereafter, the parallel fold-portions D1 and D2 are stretched out using the fold-lines H1 and H2 as the references in a direction indicated by arrows B4 in FIG. 11, so that the air bag 60 is fully expanded.

As described above, before the parallel fold-portions D1 and D2 are expanded in the perpendicular direction relative to the center line Q, the fold-portions D3, D4, and D5 expands successively in the parallel direction relative to the center line Q. Therefore, the air bag 60 can promptly expand forward relative to the backrest 10a to fill spaces between the backrest 10a and the door pillar, and between the backrest 10a and the front door (refer to FIGS. 1 and 2). As a result, the air bag 60, coupled with the later expansion of the both parallel fold-portions D1 and D2, can securely protect a passenger sitting on the driver's seat 10. In addition, because the air bag 60 is installed in the casing C in the state where the fold-portions D1 to D5 are simply folded, it is not necessary to perform a temporary fixing process and the like, thereby resulting in low cost.

Second Embodiment

In a second embodiment, instead of repeatedly folding the air bag 60 toward the side of the lower fabric member 63 as performed in the first embodiment, the air bag 60 is alternately folded toward the lower fabric member side and toward the upper fabric member side. Thus folded air bag 60 is installed in the casing C in the state shown in FIG. 12.

A method of folding the air bag 60 will be explained by referring to FIGS. 13 to 16. Firstly, the both parallel fold-portions D1 and D2 having the outer sides P2 and P3 respectively are folded in the same way as described in the first embodiment. Thereafter, a fold-line S1 shown in FIG. 13 perpendicular to the center line Q is determined as a reference, thereby defining a perpendicular fold-portion E1 having the outer side P4 opposite to the outer side P1. The perpendicular fold-portion E1 is folded along with the folded parallel fold-portions D1 and D2, toward the lower fabric member side as shown in FIG. 13.

Figure 12:
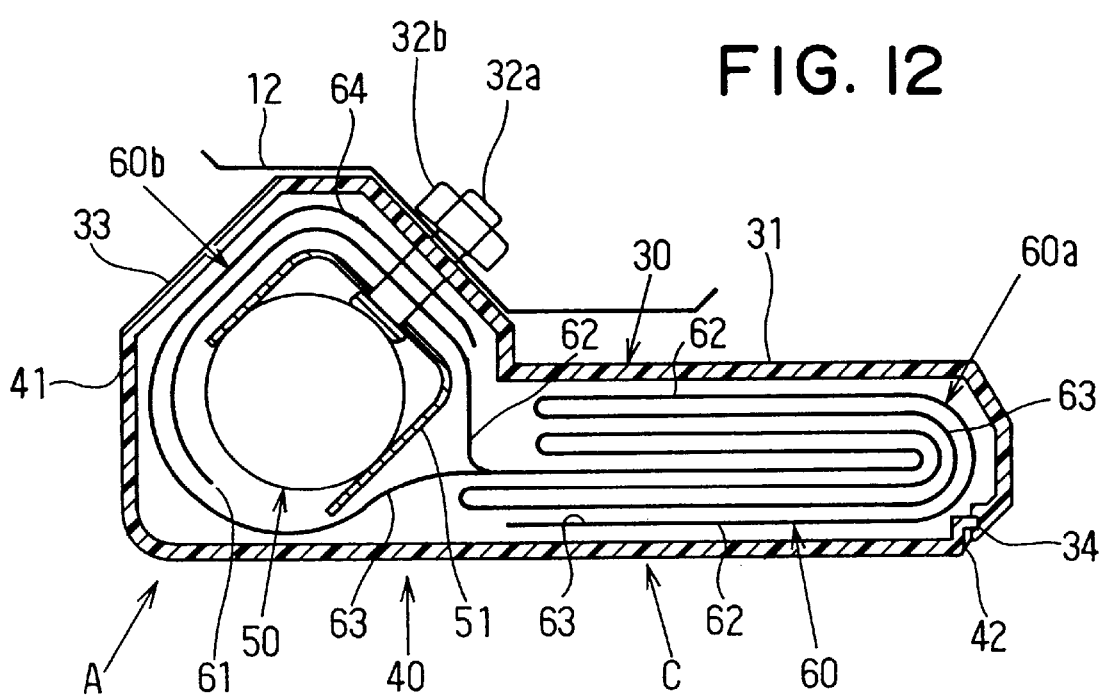
FIG. 12 is a cross-sectional view showing an air bag apparatus in a second embodiment according to the present invention.
Figure 13:
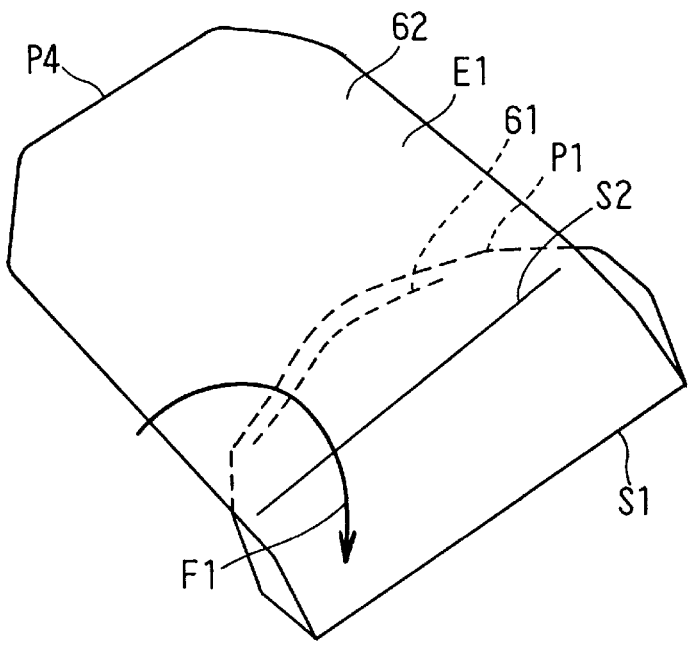
FIGS. 13 to 16 are perspective views showing a folded state of an air bag in the second embodiment.
Figure 14:
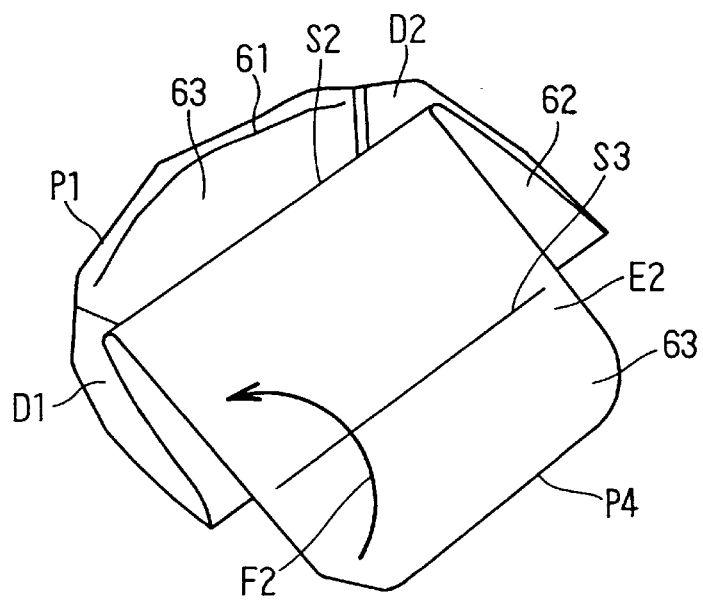
Figure 15:
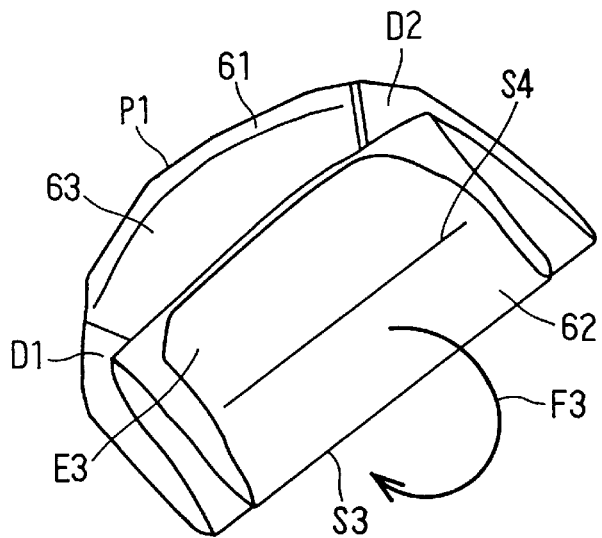

Thereafter, a perpendicular fold-portion E2 is folded toward a side of the fold-line S1 in a direction indicated by an arrow F1 in FIG. 13 using a fold-line S2 as the reference. The fold-line S2 is determined on the perpendicular fold-portion E1 in parallel with the fold-line S1. Further, a perpendicular fold-portion E3 is folded in a direction indicated by an arrow F2 in FIG. 14 using a fold-line S3 by the reference. The fold-line S3 is determined on the perpendicular fold-portion E2 in parallel with the fold-lines S1 and S2 as shown in FIG. 14. Thereafter, a perpendicular fold-portion E4 is folded in a direction indicated by an arrow F3 in FIG. 15, using a fold-line S4 as the reference. The fold-line S4 is determined on the fold-portion E3 in parallel with the fold-lines S1 to S3. As a result, the air bag 60 is folded up into the state shown in FIG. 12 to be installed in the casing C. The other structures are the same as those in the first embodiment.

Figure 16:
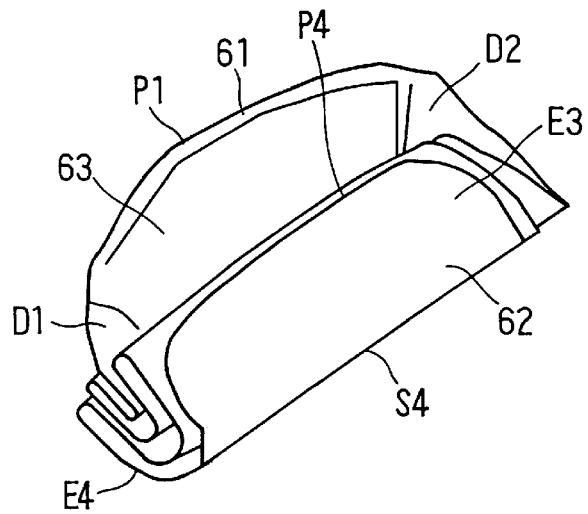

In the second embodiment, the air bag 60 is installed in the casing C in the state shown in FIGS. 12 and 16. When gas is supplied to the air bag 60 from the inflator 50, the air bag 60 starts to expand in the longitudinal direction thereof so as to undo the folded state thereof. The expansion of the air bag 60 in the second embodiment is performed more promptly and more smoothly than the first embodiment. As a result, the air bag 60 can more securely protect the passenger sitting on the driver's seat 10 than the first embodiment.

Third Embodiment

Figure 17:
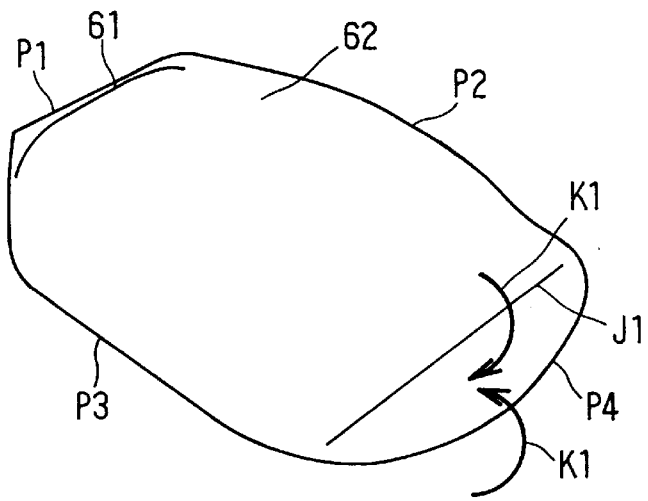
FIGS. 17 to 22 are perspective views showing a folded state of an air bag in a third embodiment according to the present invention.
Figure 18:
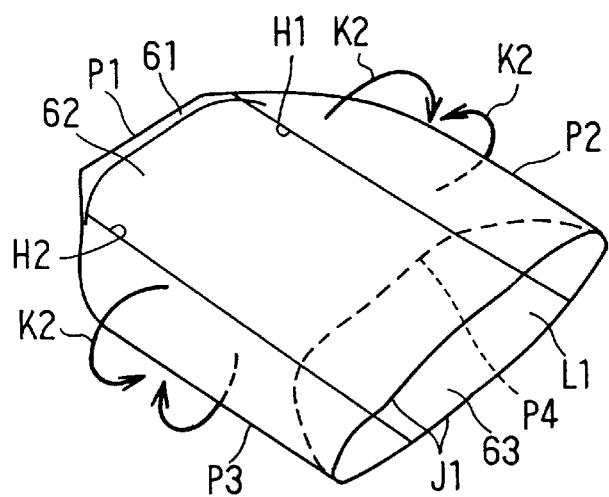

In a third embodiment, instead of the folding method of the air bag 60 in the first embodiment, another folding method of the air bag 60 shown in FIGS. 17 to 22 is adopted. In the third embodiment, firstly, a fold-line J1 perpendicular to the center line Q is determined as a reference as shown in FIG. 17, thereby defining an inside perpendicular fold-portion L1. As shown in FIG. 18, this fold-portion L1 is folded inside of the air bag 60 toward the outer side P1. Next, parallel fold-portions L2 and L3 provided on both sides of the outer sides P2 and P3 respectively are also folded inside of the air bag 60 in directions indicated by arrows K2 opposite to each other as shown in FIG. 18. In this case, the fold-lines H1 and H2 function as the references to be folded. The folded widths of the parallel fold-portions L2 and L3 are determined so that the fold-portions L2 and L3 do not overlapped on each other when folded. The perpendicular fold-portion L1 may be folded after folding the parallel fold-portions L2 and L3.

Figure 19:
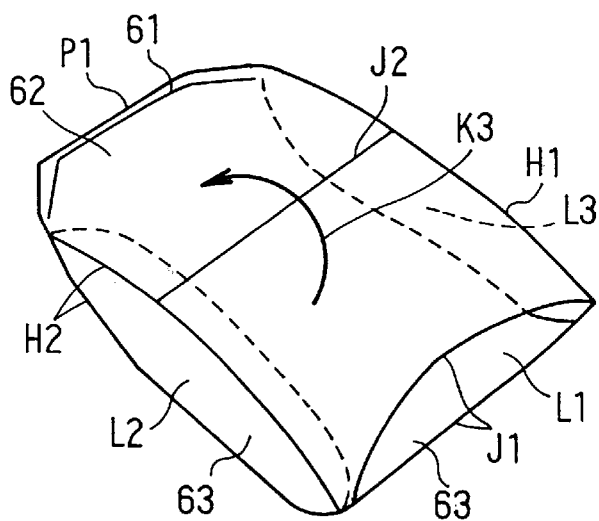
Figure 20:
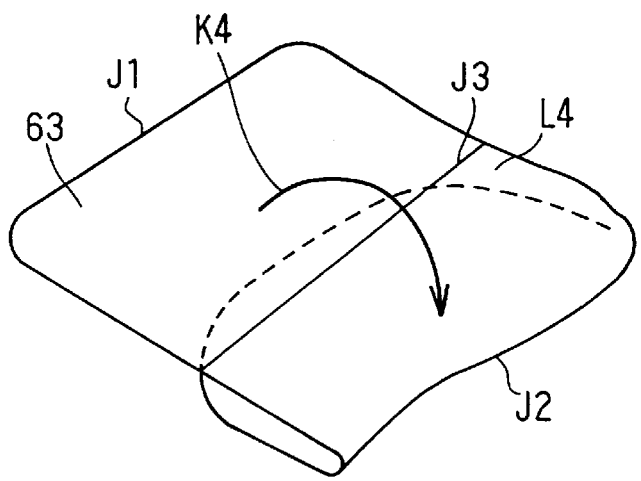
Figure 21:
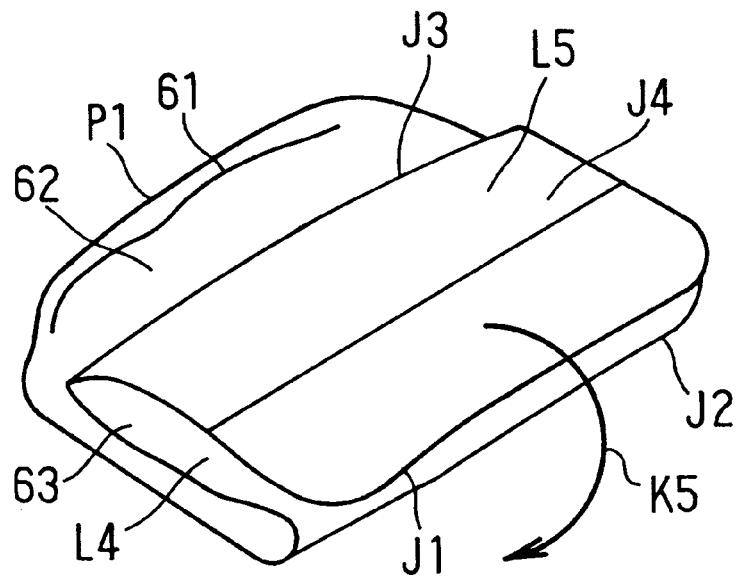

Thereafter, a perpendicular fold-portion L4 including the folded inside perpendicular fold-portion L1 is folded toward the outer side P1 in a direction indicated by an arrow K3 in FIG. 19, using a fold-line J2 determined in parallel with the fold-line J1 as a reference. Further, a perpendicular fold-portion L5, which is a part of the perpendicular fold-portion L4, is folded in a direction indicated by an arrow K4 in FIG. 20, using a fold-line J3 determined in parallel with the fold-lines J1 and J2 as a reference. Furthermore, a perpendicular fold-portion L6 is folded in a direction indicated by an arrow K5 in FIG. 21 along with the folded portions L1 to L5 which have been folded, using a fold-line J4 determined on the perpendicular fold-portion L5 in parallel with the fold-lines J1 to J3. As a result, the air bag 60 is folded up into a finally folded state shown in FIG. 22 to be installed in the casing C. The other structures are the same as those in the first and second embodiments.

Figure 22:
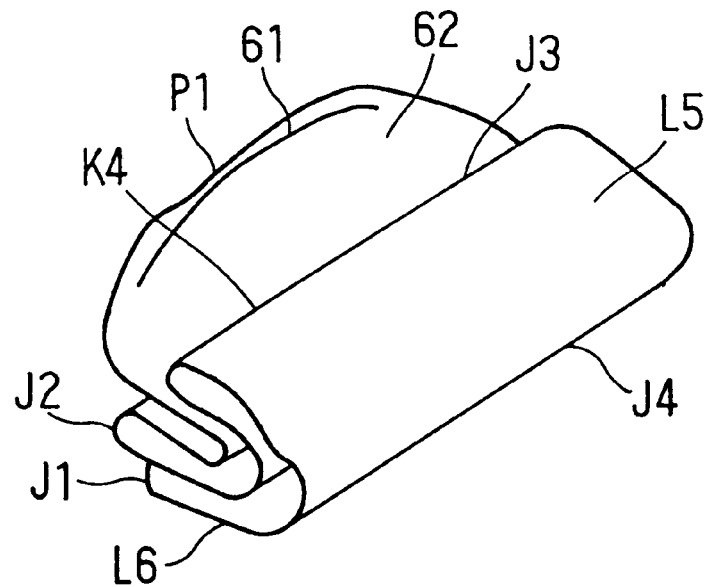

In the third embodiment, the air bag 60 is installed in the casing C in the state shown in FIG. 22. When gas is supplied to the air bag 60 from the inflator 50, the air bag 60 starts to expand in the longitudinal direction thereof so as to undo the folded state thereof. When the air bag 60 expands to change into the state shown in FIG. 19, the inside fold-portions L1, L2 and L3 start to expand in the opposite directions relative to the arrows K1 and K2 shown in FIGS. 17 and 18, and then, the air bag 60 is fully expanded. Accordingly, the air bag 60 can promptly and smoothly expand, so that the air bag 60 can securely protect the passenger sitting on the driver's seat 10. In the third embodiment, the casing member may be formed to have a U-shaped cross-section, and the inflator 50 may be installed outside.

In the above-mentioned embodiments, it is not limited that the air bag apparatus A is installed in the backrest 10a, and it may be installed in a right side front door 20b. In the first and second embodiments, it is not always necessary that the both parallel fold-portions D1 and D2 are folded, and one of the parallel fold-portions D1 and D2 may not be folded. In this case, the other of the parallel fold-portions D1 and D2 may be further folded toward the center line Q. Further, in the first embodiment, although the air bag 60 is repeatedly folded toward the lower fabric member 63, it may be folded repeatedly toward the upper fabric member 62. In the second embodiment, although the air bag 60 is repeatedly folded on the lower fabric member side and is finally folded toward the upper fabric member side, it may be repeatedly folded on the upper fabric member side and be finally folded toward the lower fabric member side. In the third embodiment, at least one of the parallel fold-portions L2 and L3 may be folded outside instead of inside. That is, at least one of the parallel fold-portions L2 and L3 may be folded toward the upper or lower fabric member side at the outside. In addition, the fold-line J1 shown in FIG. 17 may be determined closer to the outer side P1 than the position in FIG. 17.

Fourth Embodiment

Figure 23:
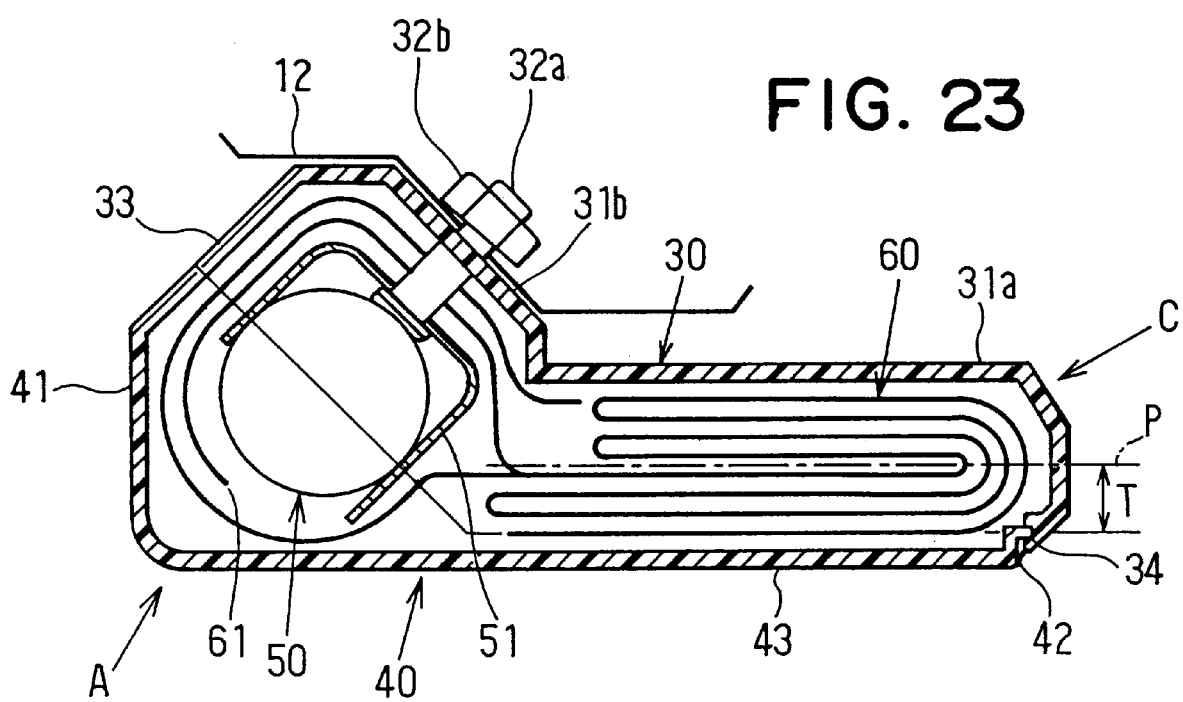
FIG. 23 is a cross-sectional view showing an air bag apparatus in a fourth embodiment according to the present invention.

In a fourth embodiment, explanations of constitutional elements which are the same as those in the above-mentioned embodiments are omitted. As shown in FIG. 23, the casing member 30 has an air bag holding portion 31a and an inflator holding portion 31b. A part of the air bag 60 holding the inflator 50 is installed in the inflator holding portion 31b of the casing member 30 and the other part of the air bag 60 is installed in the air bag holding portion 31a of the casing member 30 so as to expand toward the cover member 40 of the casing C. Here, in the state where the air bag 60 is installed in the casing C, as shown in FIG. 23, the casing member 30 has a space T between a center line P of the air bag 60 in a folded thickness direction and an opening surface of the casing member 30 which is covered by the cover member 40. That is, each depth of the casing member 30 and the cover member 40 is chosen to have the space T between the center line P of the air bag 60 and the opening surface of the casing member 30 when the air bag 60 is installed in the casing member 30 covered with the cover member 40.

In the air bag apparatus A having the above-mentioned constitution, the inflator 50 generates gas upon detecting an impact against the front door 20b of the vehicle, so that the air bag 60 starts to expand by the gas supplied from the inflator 50. At this time, because the thickness of the cover member 40 is thinner than that of the casing member 30, the cover member 40 starts to bend outward at a middle portion thereof. According to this, the engaging portion 42 of the cover member 40 is disengaged from an engaged portion 34 formed on the casing member 30 to rupture the skin 10b of the backrest 10a. As a result, the air bag 60 expands outside of the casing C as shown in FIG. 2.

As mentioned above, the casing member 30 has the space T between the center line P of the air bag 60 installed therein and the opening surface of the casing member 30. In addition, the air bag is folded to expand from the cover member side in the same manner as described in the above-mentioned embodiments. Therefore, when the cover member 40 opens, almost simultaneously, the folded portion of the air bag 60 on the side of the cover member 40 expands outside of the casing C passing through the space provided between the engaging portion 42 of the cover member 40 and the engaged portion 34 of the casing member 30 (refer to FIGS. 1 and 2). That is, the expansion of the air bag 60 becomes prompt and easy due to the offset, and the expanding direction of the air bag 60 can be determined in a direction toward the space between the backrest 10a, and the door pillar 20c and the front door 20d. In addition, because the engaging portion 42 of the cover member 40 is provided adjacent to the right side wall 11 of the backrest 10a as shown in FIG. 2, an inner wall of the recess 11 is unlikely to disturb the expansion of the air bag 60. As a result, the air bag 60 can expand promptly so as to securely protect the passenger sitting on the driver's seat 10.

In the fourth embodiment, the cover member 40 may be formed with the front portion 43 having a flat shape, thereby making the expansion of the air bag 60 easier. Further, the present invention is not limited to the side protecting type air bag apparatus A, and it may be adopted to the other air bag apparatus. The space T is changeable within a range capable of ensuring an easy expansion of the air bag 60 in the direction toward the space between the backrest 10a, and the door pillar 20c and the front door 20d. Although the air bag apparatus A is installed in the backrest 10a, it may be installed within a door of the vehicle.

Fifth Embodiment

Figure 24:
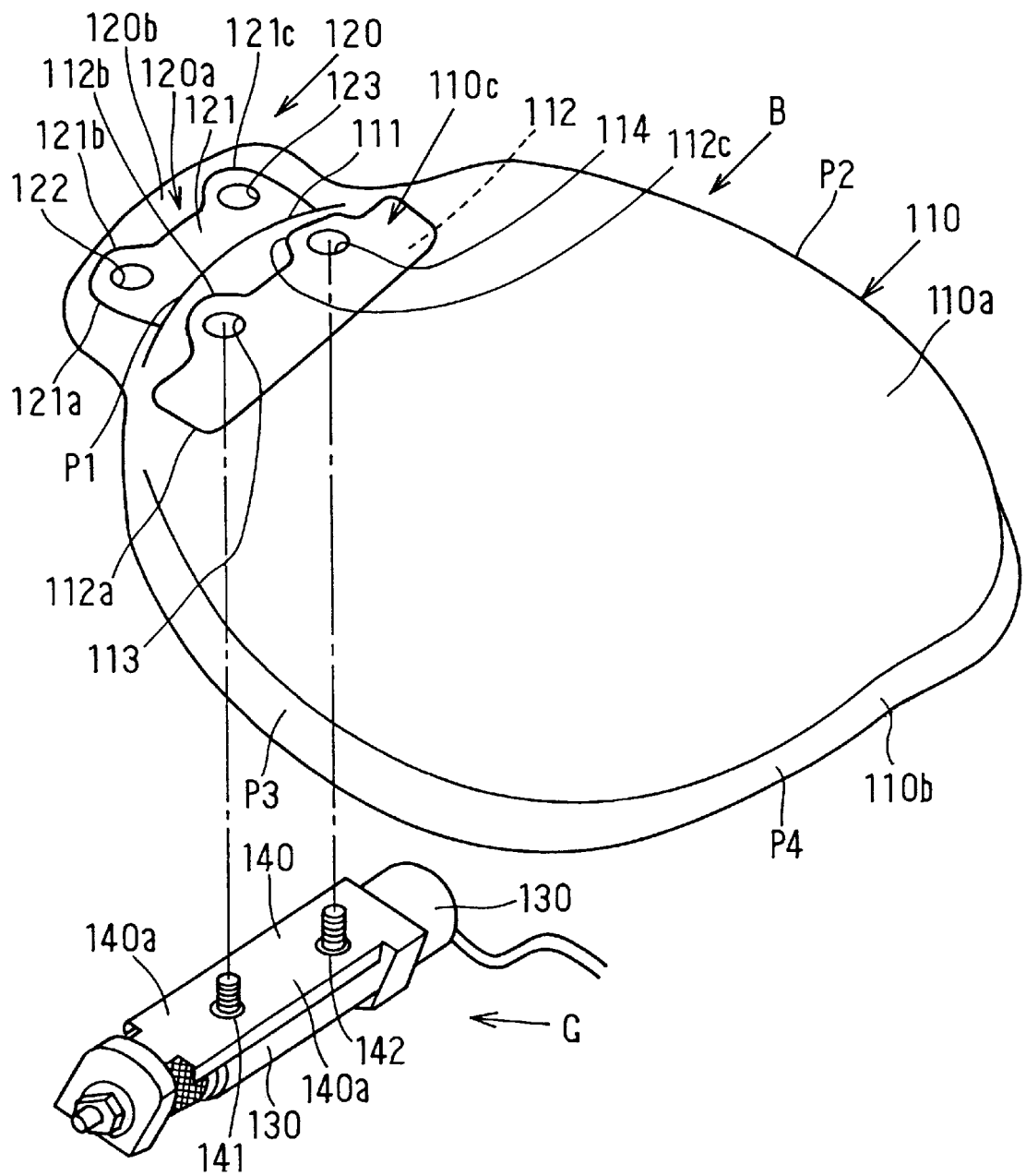
FIG. 24 is a perspective view showing an air bag and an inflator in a fifth embodiment according to the present invention.
Figure 25:
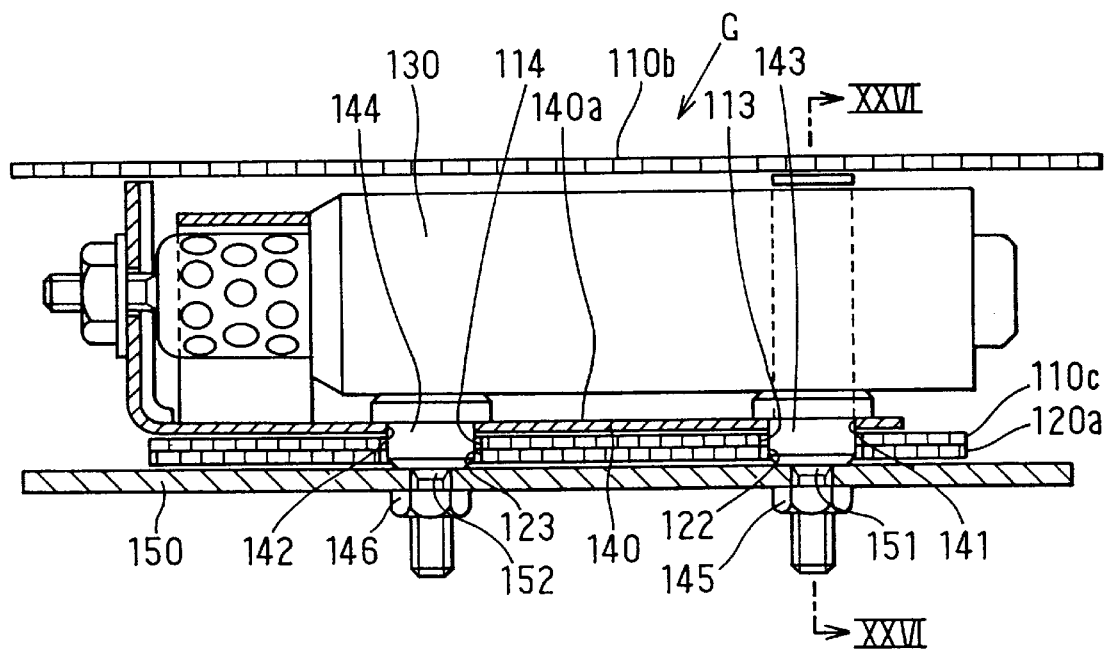
FIG. 25 is an enlarged cross-sectional view showing the inflator installed in the air bag in the fifth embodiment.
Figure 26:
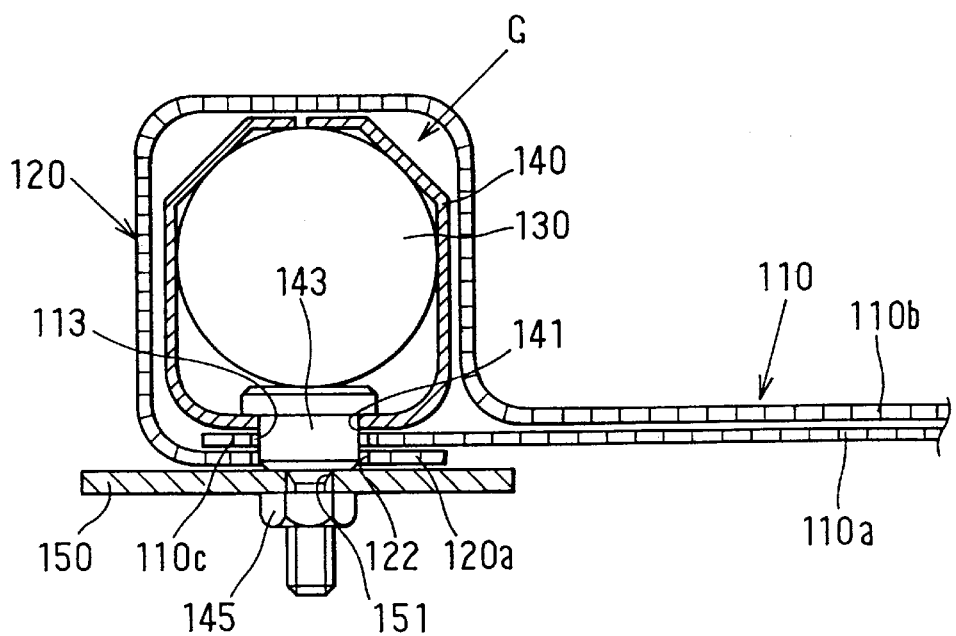
FIG. 26 is a cross-sectional view taken along a XXVI—XXVI line in FIG. 25, for showing the inflator installed in the air bag.

FIGS. 24 to 26 show a side protecting type air bag apparatus for a vehicle in a fifth embodiment. The side protecting type air bag apparatus has an air bag B and an inflator G. The air bag B is composed of an air bag body 110 having an approximately square shape and a tongue portion 120, which are integrally formed by fabric. The air bag body 110 has an upper fabric member 110a and a lower fabric member 110b. The outer circumferential margins of the upper and lower fabric members 110a and 110b are sewed by a thread to form a seam L shown in FIG. 27, thereby forming the air bag body 110 having a bag-like shape. Thereafter, the sewed bag-like air bag body turns inside out, so that the margin containing the seam L of the upper fabric member 110a and the lower fabric member 110b is positioned inside of the air bag body 110. Accordingly, the margin sewed of the upper fabric member and the lower fabric member does not become a hindrance to the other portions (refer to FIG. 29).

Figure 27:
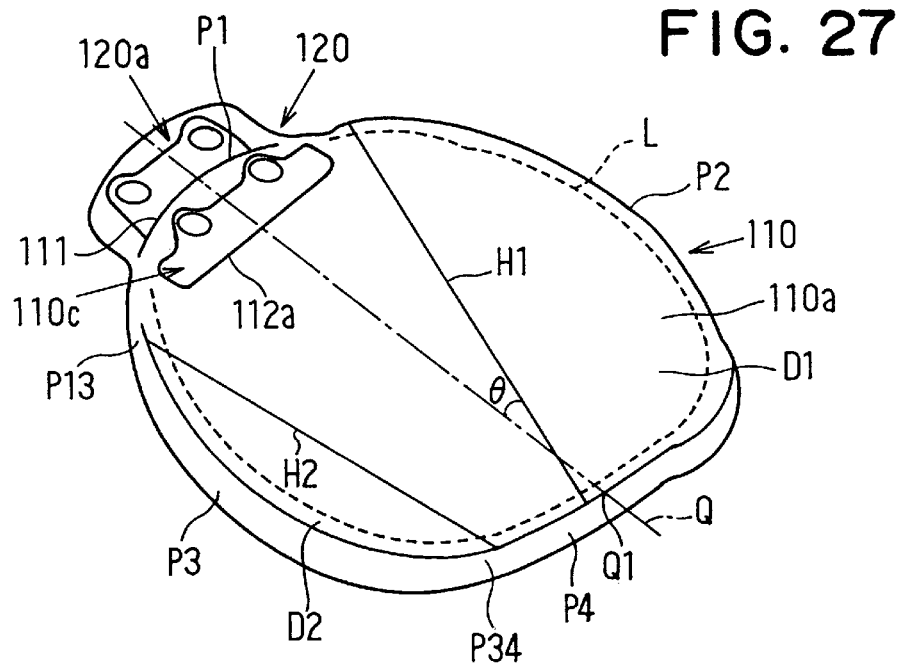
FIG. 27 is a perspective view showing fold-lines on the air bag in the fifth embodiment.

The air bag body 110 has an outer side P1 having an opening 111 for receiving the inflator G as shown in FIGS. 24 and 27. On the inner face of the upper fabric member 110a, a reinforcement fabric 112 is disposed to be sewed at an adjacent portion to the opening 111, thereby forming a reinforcement portion 110c. The reinforcement portion 110c has a pair of through holes 113 and 114 for installation. The reinforcement fabric 112 is sewed to the upper fabric member 110a along the outer circumference thereof by a thread before sewing the upper fabric member 110a and the lower fabric member 110b. Numeral 112a in FIG. 24 denotes a seam of the reinforcement fabric 112.

The tongue portion 120 also has a reinforcement portion 120a formed at an overlapped portion 120b to correspond to the reinforcement portion 110c on the upper fabric member 110a. The reinforcement portion 120a is formed by sewing a reinforcement fabric 121 on the inner face of the tongue portion 120 at the overlapped portion 120b, and has a pair of through holes 122 and 123 for installation to correspond to the through holes 113 and 114 of the upper fabric member 110a as shown in FIG. 24. Numeral 121a in FIG. 24 denotes a seam of the reinforcement fabric 121.

In the fifth embodiment, synthetic fiber such as nylon, polyester or the like, vegetable fiber, animal fiber or the like can be employed as the fabric of the air bag body 110, the tongue portion 120, and as the reinforcement fabrics 112 and 121.

As shown in FIGS. 24, 25 and 26, the inflator G has an inflator body 130 which is installed in a metallic casing 140. The inflator G is held in the air bag body 110 along with the metallic casing 140 at a position adjacent to the opening 111 so that the axial direction thereof corresponds to the width direction of the opening 111 of the air bag body 110, that is, corresponds to a vertical direction of the backrest 10a in which the air bag apparatus is installed. The tongue portion 120 of the air bag body 110 extends along the outer circumferential wall of the metallic casing 140. In addition, the overlapped portion 120b of the tongue portion 120 is overlapped on an outer side of the upper fabric member 110a. As shown in FIG. 25, the reinforcement portions 110c and 120a of the upper and lower fabric members 110a and 110b are sandwiched between an upper wall 140a of the metallic casing 140 and a frame 150 for installation so as to be fixed by fastening the bolts 143 and 144, and nuts 145 and 146. Here, each bolts 143 and 144 are inserted from the inside of the upper wall 140a of the metallic casing 140, into the through holes 141 and 142 of the upper wall 140a, the through holes 113 and 114 of the reinforcement portion 110c, the through holes 122 and 123 of the reinforcement portion 120a, and through holes 151 and 152 of the frame 150 so as to be tightened by the nuts 145 and 146.

Next, a method of folding the air bag B holding the inflator G will be explained referring to FIGS. 27 to 33. Firstly, fold-lines H1 and H2 shown in FIG. 27 are determined on the air bag body, and both inside fold-portions D1 and D2 including outer sides P2 and P3, respectively, are folded in a direction indicated by arrows A in FIG. 28 to be positioned inside of the air bag body 110. In this case, the fold-lines H1 and H2 function as references. The outer sides P2 and P3 are positioned between the outer sides P1 and P4 opposite to each other.

As shown in FIG. 27, the fold-line H1 makes a specific angle Θ with a center line Q of the air bag body 110. The fold-line H2 is oblique relative to the center line Q to connects a boundary P13 between the outer sides P1 and P3, and a boundary P34 between the outer sides P3 and P4. The specific angle Θ and each folded width of the inside fold-portions D1 and D2 are determined so that the inside fold-portions D1 and D2 do not overlapped each other when folded inside of the air bag body 110.

Figure 28:
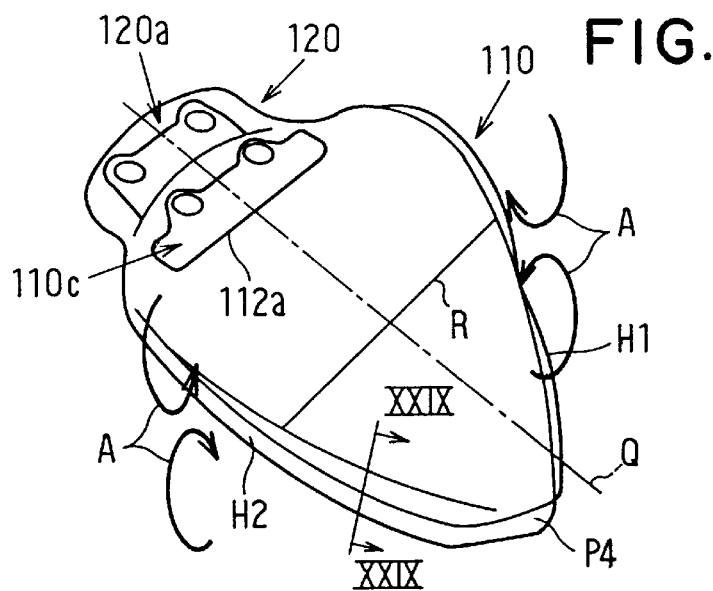
FIG. 28 is a perspective view showing a folded state of the air bag in the fifth embodiment.
Figure 29:
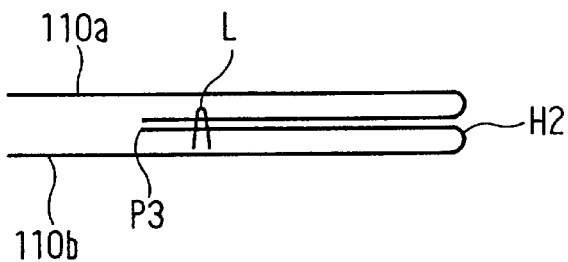
FIG. 29 is a partially enlarged cross-sectional view taken along a XXIX—XXIX line in FIG. 28, showing the air bag.

The state where the inside fold-portions D1 and D2 are folded is shown in FIGS. 28 and 29. The inside fold-portions D1 and D2 are folded so that the margin sewed of the air bag body 110 is further pushed into the inside of the air bag body 110. Therefore, in the air bag body 110, the thickness of the folded part including the margin is approximately the same as those of the other folded parts. The thickness is approximately two times as thick as the sum of the thicknesses of the upper and lower fabric members 110a and 110b. That is, because the inside fold-portions D1 and D2 are not overlapped each other when folded, the thickness of the folded air bag body 110 is approximately two times as thick as the sum of the thicknesses of the upper and lower fabric members 110a and 110b. As a result, the thickness of the air bag body 110 after folding the inside fold-portions D1 and D2 can be minimized at an entire folded area of the air bag body 110. Here, on condition that the inside fold-portions D1 and D2 are not overlapped each other, each folded width of the inside fold-portions D1 and D2 and the above-mentioned specific angle Θ may be changed appropriately.

Figure 30:
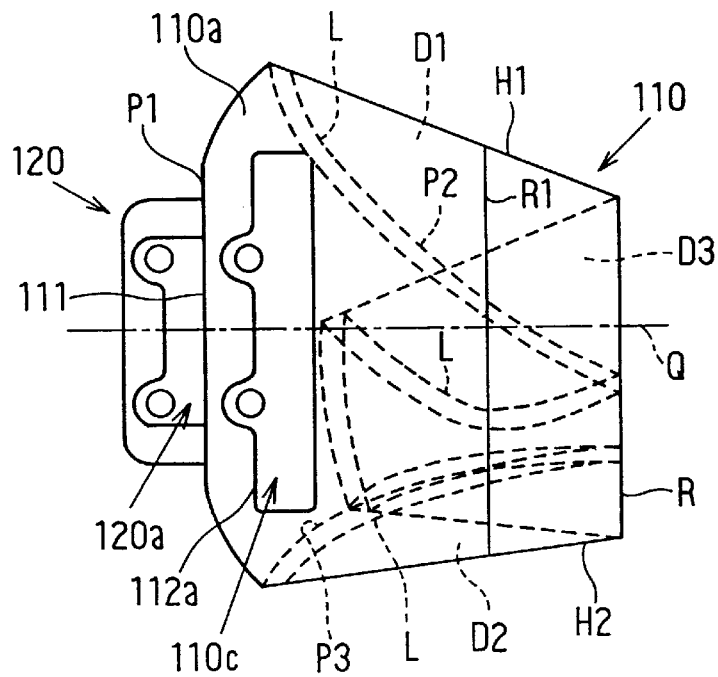
FIGS. 30 to 33 are plan views showing folded a state of the air bag in the fifth embodiment.

Next, as shown in FIG. 30, a perpendicular fold-portion D3 of the air bag body 110 is folded toward the lower fabric member side using a fold-line R shown in FIG. 28 as a reference. The fold-line R crosses the center line Q approximately at right angles, approximately at a middle point between the outer side P4 and the seam 112a of the reinforcement fabric 112 on the right side in FIG. 28. In this case, as mentioned above, the inside fold-portions D1 and D2 are folded toward the inside of the air bag body 110 obliquely relative to the center line Q not to be overlapped each other in advance. Therefore, when the perpendicular fold-portion D3 is folded, a part of the seam L in the perpendicular fold-portion D3 crosses the other parts of the seam L in the inside fold-portions D1 and D2, however, does not overlap with the other part of the seam L in the direction of the seam L. As a result, the thickness of the air bag body 110 after folding the inside fold-portions DI and D2 and the perpendicular fold-portion D3 becomes thin compared to the other case where the part of the seam L in the perpendicular fold-portion D3 overlaps with the other parts of the seam L in the direction of the seam L.

Figure 31:
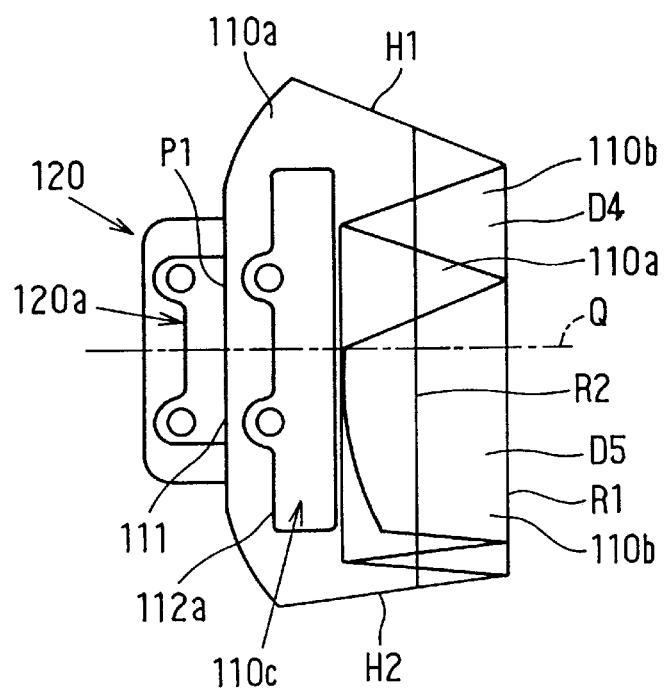

After folding the perpendicular fold-portion D3, a perpendicular fold-portion D4 is folded toward the upper fabric member side along with the perpendicular fold-portion D3, using a fold-line R1 shown in FIG. 30 as a reference. Successively, a perpendicular fold-portion D5, which is an end portion from the fold-line R1 on the perpendicular fold-portion D4, is folded toward the opening side using the fold-line R1. As a result, the perpendicular fold-portion D5 is overlapped on the other part of the perpendicular fold-portion D4 as shown in FIG. 31. Here, the fold-line R1 crosses the center line Q approximately at right angles, approximately at a middle point between the fold-line R and the seam 112a of the reinforcement fabric 112 on the right side in FIG. 30.

As mentioned above, after folding the inside fold-portions D1 and D2 obliquely relative to the center line Q not to overlap each other, the perpendicular fold-portions D3, D4, and D5 are folded using the fold-lines R, R1 and R1, respectively, perpendicular to the center line Q. Therefore, each part of the seam L included in the inside fold-portions D1 and D2 and the perpendicular fold-portions D3, D4, and D5 merely crosses each other, and does not overlap each other. As a result, the thickness of the folded air bag body 110 can be decreased without being affected by the seam L.

Figure 32:
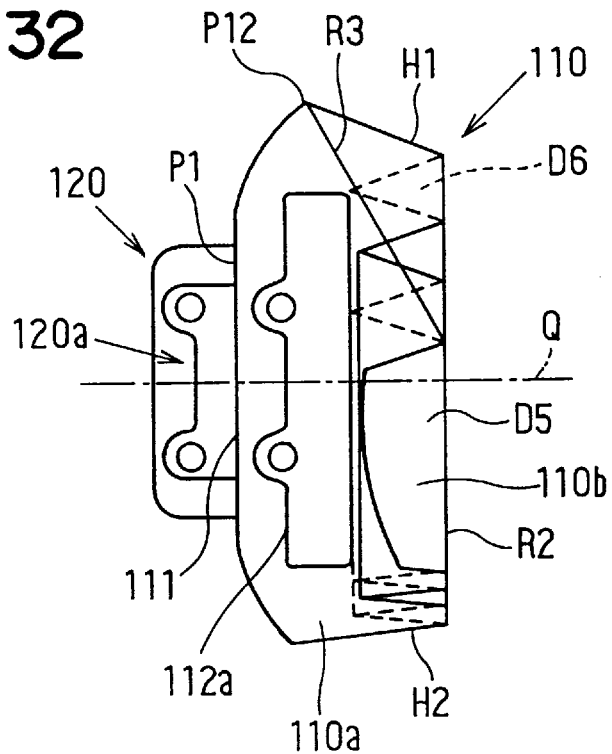

Thereafter, as shown in FIG. 32, a perpendicular fold-portion D6 (refer to FIG. 32) is folded toward the lower fabric member side using a fold-line R2 shown in FIG. 31. The fold-line R2 crosses the center line Q approximately at right angles, approximately at a middle point between the fold-line R1 and the seam 112a of the reinforcement fabric 112 on the right side in FIG. 31. In this case, each part of the seam L included in the fold-portions D1 to D6 does not overlap each other either, so that the thickness of the folded air bag body 110 can be thinned without being affected by the seam L.

Figure 33:
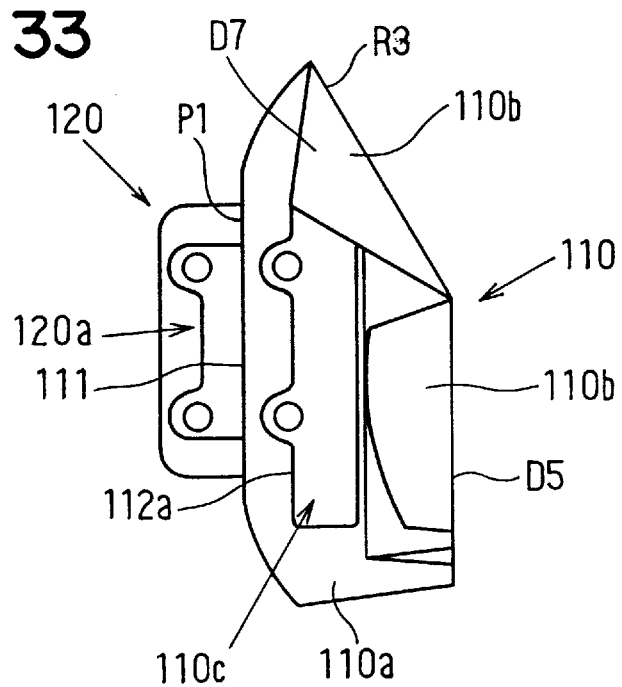

Further, an oblique fold-portion D7 is folded toward the upper fabric member side using a fold-line R3 shown in FIGS. 32 and 33. The fold-line R3 is oblique relative to the center line Q and connects a point on the fold-line R2 on an upper side relative to the center line Q in FIG. 32 by a specific length, and a boundary P12 between the outer sides P1 and P2. Therefore, even when the oblique fold-portion D7 is folded, each part of the seam L included in the fold-portions D1 to D7 does not overlap each other along the seam direction, preventing the increase of the folded thickness of the air bag.

Consequently, the final folded thickness of the air bag body 110 can be minimized. Accordingly, the air bag can be easily installed in a holding portion. In addition, because the folded width of the inside fold-portion D1 is larger than that of the inside fold-portion D2, when the oblique fold-portion D7 is folded, the thickness of the air bag body 110 at an adjacent portion to the boundary P12 between the outer sides P1 and P2 can be thinned.

The side protecting type air bag apparatus having thus folded air bag B and the inflator G is installed into the vehicle. When an ignition control system ignites the inflator G upon detecting an impact of the vehicle on the basis of an detected amount of an acceleration sensor, the inflator body 130 of the inflator G generates gas to supply the gas into the air bag body 110, thereby expanding the air bag body 110 in an expanding direction (in a forward direction relative to the backrest 10a holding the air bag apparatus). In this case, the air bag body 110 expands in the reverse order relative to the above-mentioned folded order. Therefore, the air bag body 110 can expand smoothly and promptly.

Figure 34:
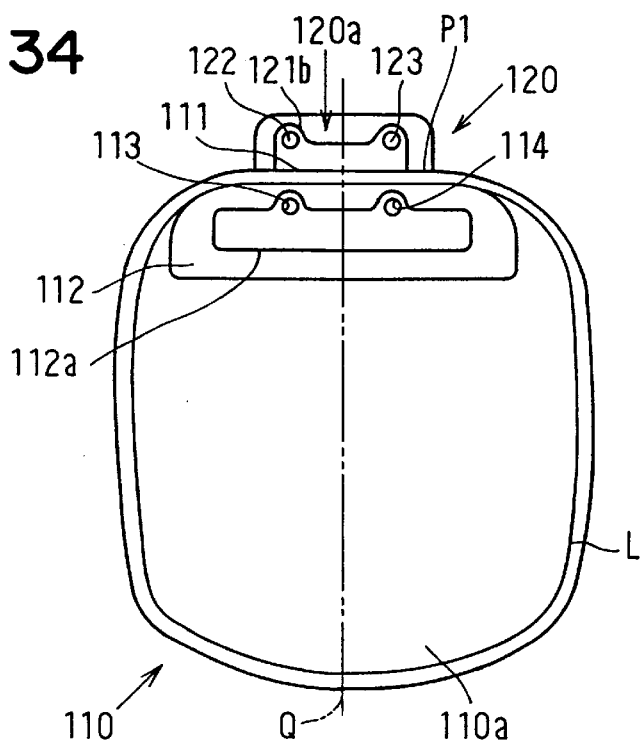
FIG. 34 is a plan view showing an air bag in modified embodiment of the fifth embodiment.
Figure 35:
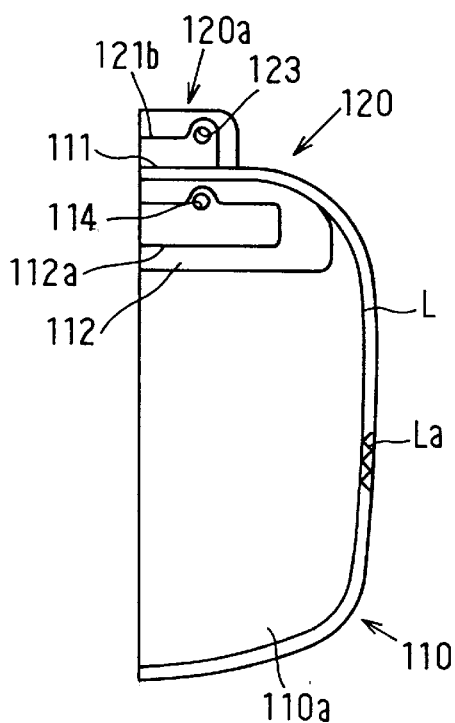
FIGS. 35 and 36 are plan views for explaining steps of folding the air bag in the modified embodiment.
Figure 36:
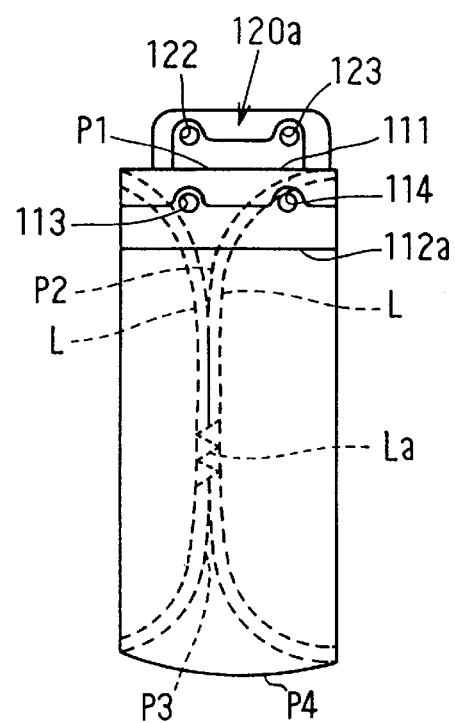

Next, a modified embodiment of the fifth embodiment will be explained referring to FIGS. 34 to 36. In this modified embodiment, after sewing the upper and lower fabric members 110a and 110b along the seam L shown in FIG. 34, and before turning the air bag body 110 inside out, as shown in FIG. 35, the air bag body 110 is folded using the center line Q as a fold-line so that the outer sides P2 and P3 overlap to each other. In this state, a provisional sewing fixation La shown in FIG. 35 is performed with a thread. Then, the air bag body 110 turns inside out. In this case, folding the inside fold-portions D1 and D2 accompany the turning of the air bag body 110. That it, the inside fold-portions D1 and D2 can be automatically folded inside by turning the air bag body 110 inside out. Accordingly, the same effects as those in the fifth embodiment can be obtained. In addition, the process of folding the inside fold-portions D1 and D2 can be abolished.

The present invention can be applied to the side protecting type air bag apparatus for the driver's seat as well as for the passenger seat. The air bag body 110 can be formed by adhering with adhesives, by thermal fusing, or the like, in place of by sewing. Further, the air bag may have an approximately square shape without the tongue portion. In this case, it is desirable that the air bag has an opening for receiving the inflator at an adjacent portion to one of outer sides of the air bag. The shape of the air bag is not limited to the square shape, and it may be a round shape or the like, and the position of the opening is not limited to the above-mentioned position, either. Further, each of the inside fold-portions D1 and D2, the oblique fold-portion D7, and each of the perpendicular fold-portions D3 to D6 may be folded in the reverse direction relative to the above-mentioned folded direction. In place of the inside fold-portions D1 and D2, the other inside fold-portions which are parallel to the center line Q of the air bag body may be adopted to the present invention, and the folded widths of the inside fold-portions D1 and D2 may be equal to each other.

Sixth Embodiment

In a sixth embodiment, a side protecting type air bag apparatus A for a vehicle is installed in a vehicle in the same manner in the first embodiment as shown in FIG. 1. As mentioned above, the air bag apparatus A has a casing C including a casing member 30 and a cover member 40. The detail description as described in the first embodiment is omitted.

Figure 37:
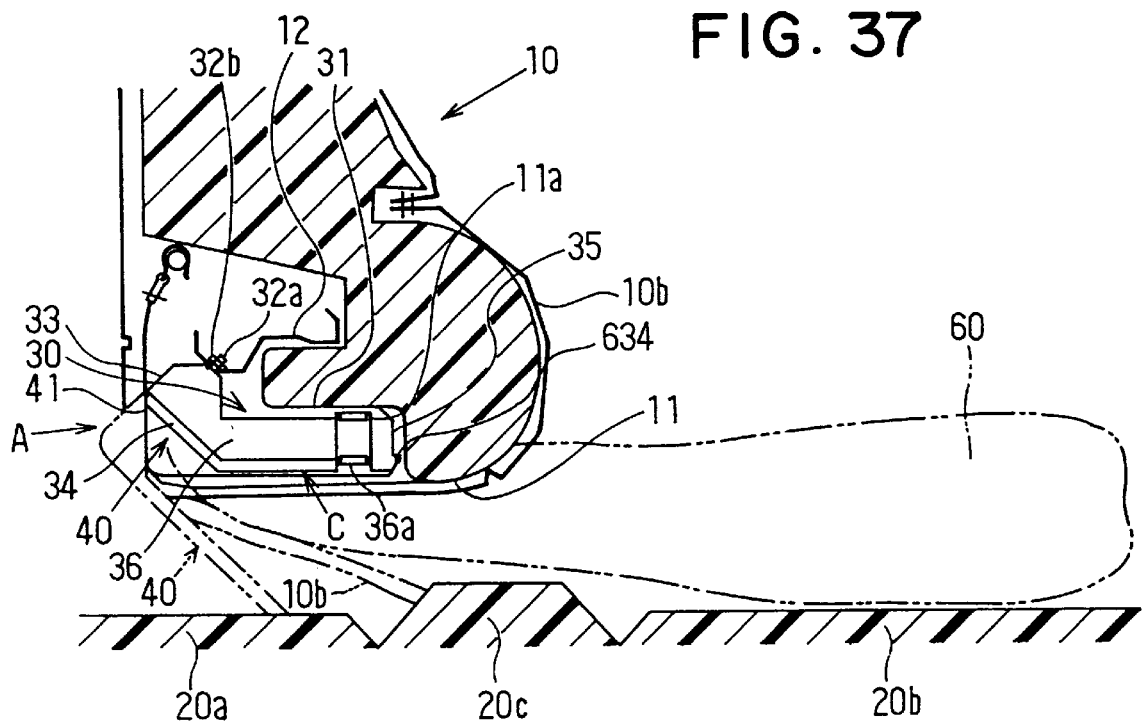
FIG. 37 is a cross-sectional view showing an air bag apparatus installed within a right side wall of a backrest of a driver's seat in a sixth embodiment according to the present invention.
Figure 38:
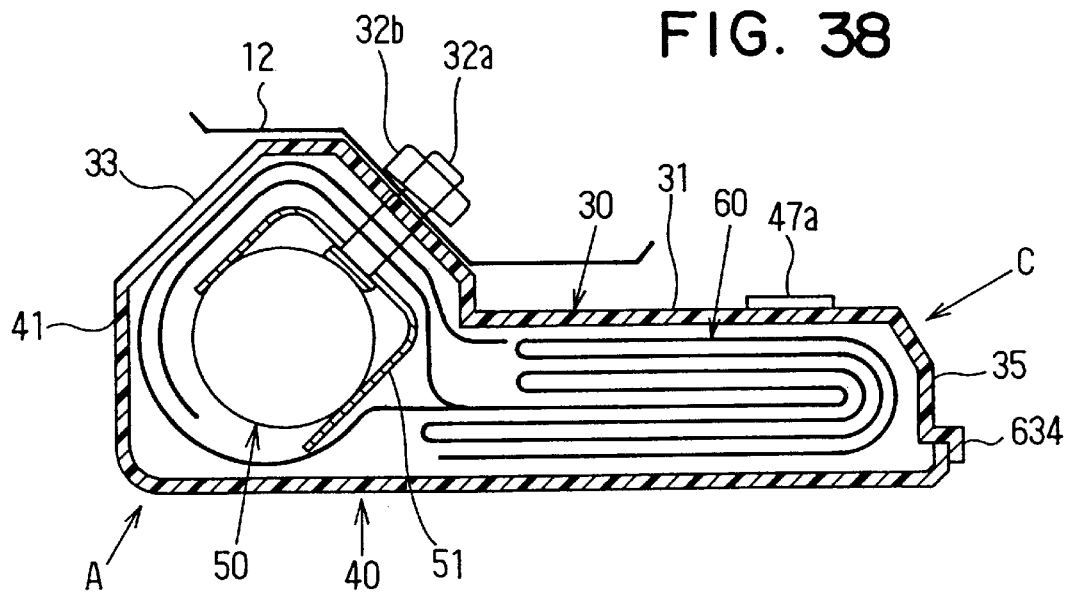
FIG. 38 is a cross-sectional view showing the air bag apparatus in the sixth embodiment.
Figure 39:
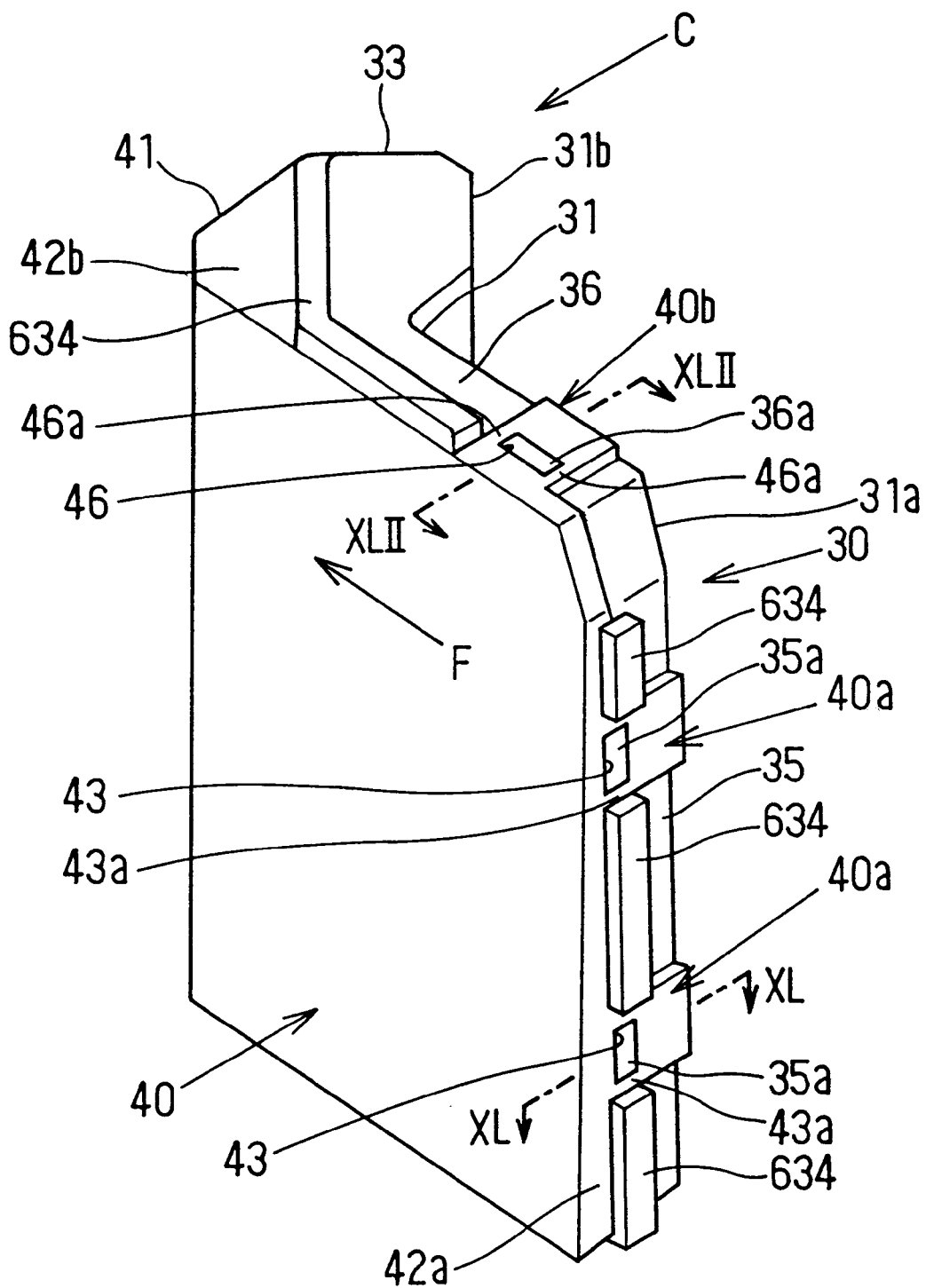
FIG. 39 is a perspective view showing a casing of the air bag apparatus in the sixth embodiment.
Figure 40:
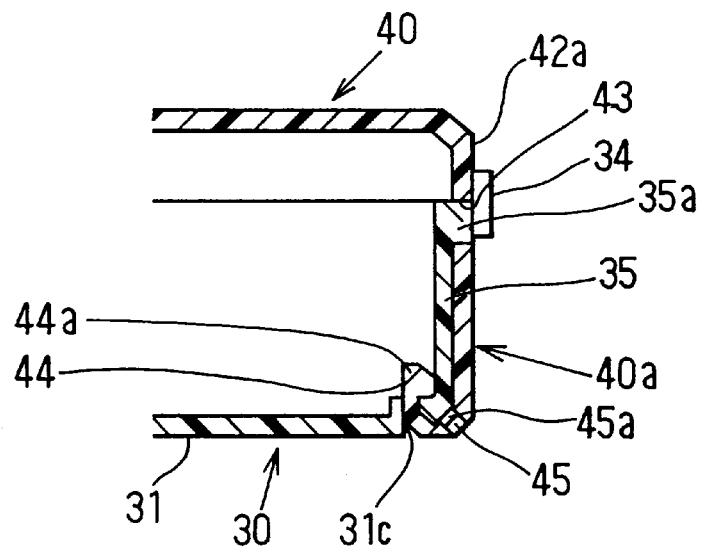
FIG. 40 is a partial cross-sectional view taken along a XL—XL line in FIG. 39, showing the casing.

A feature in the sixth embodiment resides in an engaging structure capable of engaging and disengaging the cover member 40 with and from the casing member 30. The casing member 30 has plural L-shaped protrusions 634 shown in FIGS. 38, 39 and 40. The L-shaped protrusions 634 are formed into a L-shape in a cross-section to protrude outward on a verge portion of an opening of the casing member 30 in order to engage with a verge portion of the cover member 40. The casing member 30 further has two front protrusions 35a having a generally rectangular shape in a cross section on the front wall 35 thereof. As shown in FIGS. 39 and 40, three L-shaped protrusions 634 are formed on the front wall 35, and the front protrusions 35a are formed between the L-shaped protrusions 634, respectively. In addition, as shown in FIGS. 37 and 39, the casing member 30 has side protrusions 36a having a generally rectangular shape in a cross section on a right and a left side walls 36 thereof so as to protrude in opposite directions each other.

Figure 41A:
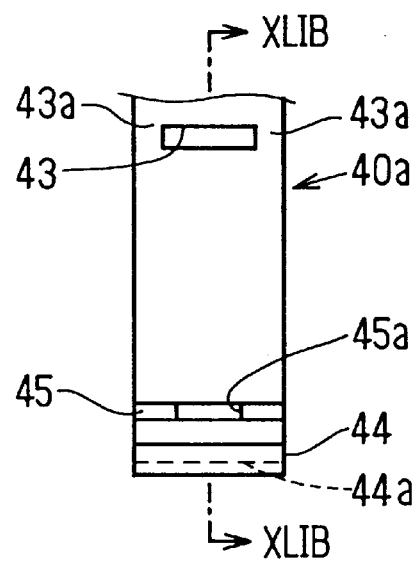
FIG. 41A is a front view showing a front hook of a cover member of the casing member.
Figure 41B:
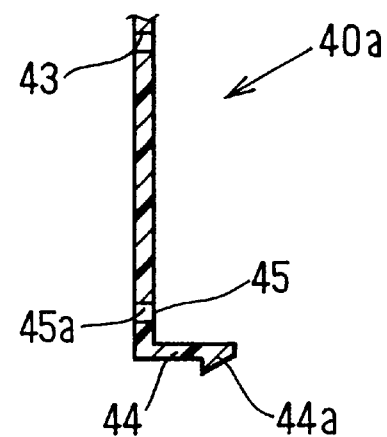
FIG. 41B is a cross-sectional view taken along a XLIB—XLIB line in FIG. 41A, showing the front hook.

On the other hand, the cover member 40 has a pair of front band-like hooks 40a on the front wall 42a thereof to correspond to the front protrusions 35a of the casing member 30. The front hooks 40a are formed to extends along the surface of the front wall 35 of the casing member 30 when the cover member 40 is engaged with the casing member 30. As shown in FIGS. 40, 41A, and 41B, each of the front hooks 40a has a front engaging through hole 43 having a rectangular shape so that the front protrusions 35a of the casing member 30 can be inserted into the engaging through holes 43.

A front end portion 44 of each front hook 40a is bent toward the inside surface side thereof so that the front hook 40a has an L-shape, and has a claw 44a protruding toward the outside surface side thereof like a tooth of a saw. The claw 44a is to be engaged with an engaging through hole 31C shown in FIG. 40 formed in a bottom wall 31 of the casing member 30.

When the claw 44a is inserted into the engaging through hole 31c, the front hook 40a is bent along the corner portion between the front wall 35 and the bottom wall 31 of the casing member 30 so as to have a U-shape as shown in FIG. 40, thereby engaging with the engaging through hole 31c. To make it easy, the front hook 40a has a groove 45 on the inside surface thereof so as to correspond to the corner portion between the front wall 35 and the bottom wall 31 of the casing member 30. The groove 45 is formed in a width direction of the front hook 40a and has a through hole 45a shown in FIG. 41A. With this structure, because the claw 44a is inserted into the engaging through hole 31c in a state capable of engaging and disengaging, as shown in FIG. 40. In this case, because the claw 44a has the tooth-like shape, the insertion of the claw 44a into the engaging through hole 31c becomes easy. Simultaneously, the front protrusions 35a of the casing member 30 is inserted into the engaging through holes 43 of the front hooks 40a.

Here, the front hook 40a has breakage portions 43a shown in FIG. 41A sandwiching the engaged through holes 43. In the front hook 40a, a breakage strength of the breakage portion 43a is smaller than that of the groove 45 including the through hole 45a (refer to FIG. 41A). Each length of the front hooks 40a is chosen not to have a sag when the claw 44a is engaged with the engaging through hole 31c so that the casing C is closed by the cover member 40.

Figure 42:
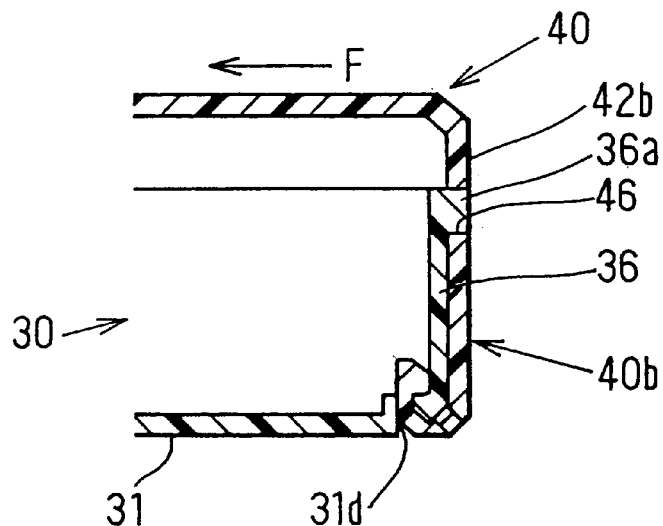
FIG. 42 is a partial cross-sectional view taken along a XLII—XLII line in FIG. 39, showing the casing.
Figure 43A:
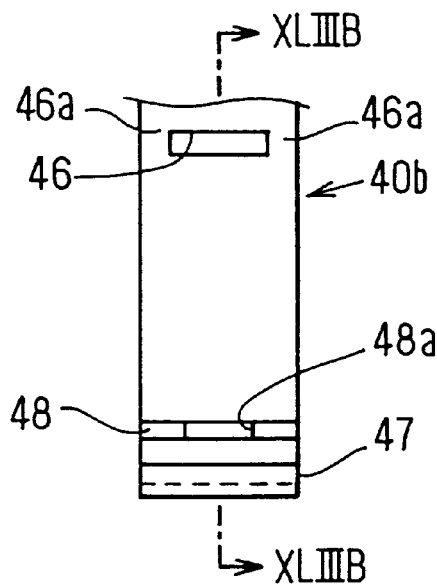
FIG. 43A is a front view showing a side hook of the cover member.
Figure 43B:
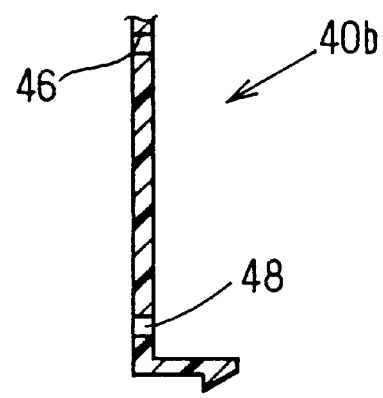
FIG. 43B is a cross-sectional view taken along a XLIIIB—XLIIIB line in FIG. 42A, showing the side hook.

In addition, the cover member 40 has side hooks 40b a right and a left side walls 42b thereof. The side hooks 40b shown in FIG. 39 are formed to face the outside surfaces of the side walls 36 of the casing member 30 so as to correspond to the side protrusions 36a. As shown in FIGS. 42, 43A and 43B, each of the side hooks 40b has the same structure as that of each front hook 40a shown in FIGS. 40, 41A, and 41B.

In the side hook 40b, a breakage strength of a breakage portion 46a sandwiching an engaging through hole 46 shown in FIG. 43A is smaller than that of a groove 48 including a through hole 48a, as well. Further, the sum of the breakage strengths of the front hooks 40a is set to be smaller than the sum of the breakage strengths of the side hooks 40b. Accordingly, when the casing C is opened by the expansion of the air bag, the front hooks 40a are broken previous to the breakage of the side hooks 40b.

Held in the above-mentioned casing C is the air bag 60 and the inflator 50. The inflator 50 is received in the air bag 60, while facing the opening of the air bag 60 to be held within the back portion of the casing member 30, and the air bag 60 other than the part of the air bag 60 holding the inflator 50 is folded to be held within the front portion of the casing member 30 so as to expand forward of the casing C. This installation of the air bag 60 having the inflator 50 is performed in a state where the casing C opens, and then, the casing member 30 is closed by the cover member 40. In this state, the verge portion of the cover member 40 abuts to the verge portion of the casing member 30 at the inside of the L-shaped protrusions 634.

Next, the front hooks 40a and the side hooks 40b of the cover member 40 are engaged with the casing member 30 in the state capable of disengaging from the casing member 30 by the expansion of the air bag 60 in the following manner. Firstly, the front protrusions 35a of the casing member 30 are inserted into the engaging through holes 43 of the front hooks 40a, respectively. In this case, it is desired that the depth of each engaging through hole 43 is longer than the protruding length of each front protrusion 35a. In addition, when the front end of each front protrusion 35a has an L-shape projecting toward the bottom wall side of the casing member 30, the engagements between the front protrusions 35a and the engaging through holes 43 become more secure.

Thereafter, the front hooks 40a are bent along the bottom wall 31 of the casing member 30, respectively. In this case, because each front hook 40a has the groove 45 and the through holes 45a, the front hooks 40a can be easily bent. If it is not necessary, the groove 45 and the through holes 45a of each front hook 40a may be omitted. Successively, each claw 44a of the front hooks 40a is inserted into each engaging through hole 31c of the casing member 30 so that an inside wall of each claw 44a contacts the back portion of each engaging through hole 31c, thereby preventing detachment thereof.

The side hooks 40b of the cover member 40 are also engaged with the casing member 30 in the same way as the front hooks 40a. In this way, the cover member 40 is fixed to the casing member 30 by the front and side hooks 40a and 40b in the state capable of engaging and disengaging.

Thus closed casing C is installed in the above-mentioned backrest 10a. As a result, the installation of the air bag apparatus is completed. When the air bag apparatus is installed, even if an external force is applied to the cover member 40 in a direction indicated by an arrow F shown in FIG. 39 or 42, because the cover member 40 is securely fixed to the casing member 30 by the front and side hooks 40a and 40b, the cover member 40 does not move relative to the casing member 30 by the external force. That is, the cover member 40 does not open by the external force.

When the impact against the front door 20b of the vehicle is detected, the inflator 50 generates gas, and the gas is supplied to the air bag 60. Accordingly, the air bag 60 starts to expand to push the cover member 40. By the expansion of the air bag 60, the breakage portions 43a of the front hooks 40a of the cover member 40 are broken. In this case, because the sum of the breakage strengths of the breakage portions 43a of the front hooks 40a is smaller than that of the breakage portions 46a of the side hooks 40b, the breakages of the breakage portions 43a occur prior to the breakages of the breakage portions 46a. That is, when the front portion of the cover member 40 is opened by the expansion of the air bag 60, the side hooks 40b of the cover member 40 keep engaging with the projections 36a and the engaging through holes 31d of the casing member 30.

As a result, the expanding direction of the air bag 60 is determined, so that the air bag 60 expands to protrude forward through the space between the front walls of the casing member 30 and the cover member 40. In this case, as mentioned above, in the front hooks 40a, the breakage strength of the groove 45 including the through hole 45a is bigger than that of the breakage portions 43a. Therefore, the front end portions of the front hooks 40a can keep engaging with the casing member 30 without being broken when the breakage portions 43a are broken.

Figure 44:
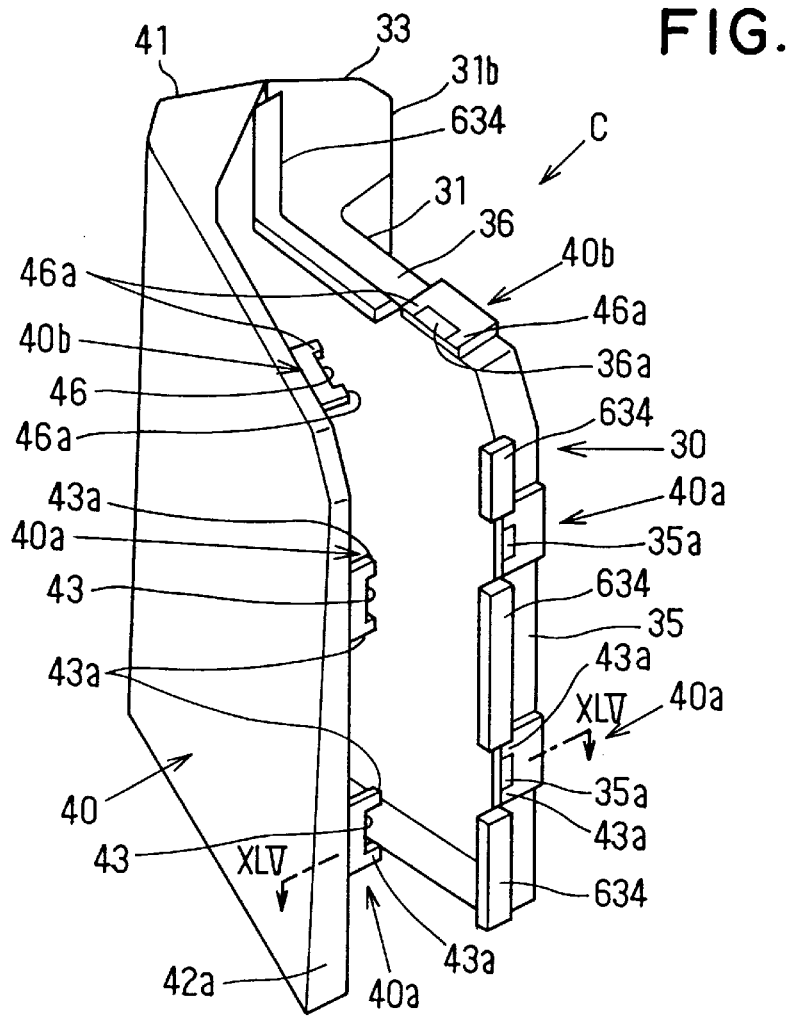
FIG. 44 is a perspective view showing the casing opened in an initial state.
Figure 45:
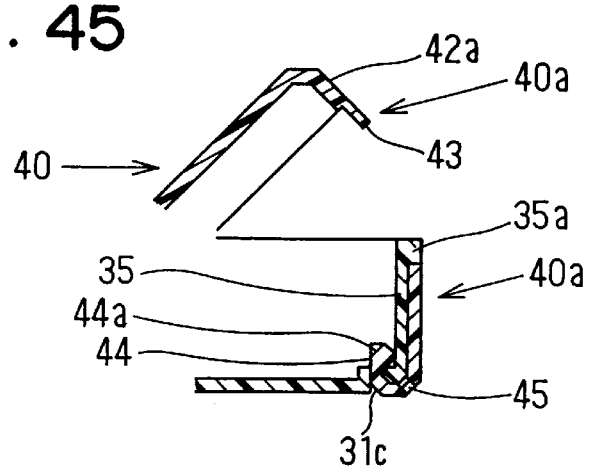
FIG. 45 is a partial cross-sectional view taken along a XLV—XLV line in FIG. 44, showing the casing.

Thereafter, when the air bag 60 further expands forward pushing the cover member 40, the breakage portions 46a of the side hooks 40b are broken as shown in FIGS. 44 and 45, thereby expanding forward further. In this case, in the side hooks 40b, the breakage strength of the groove 48 including the through hole 48a is bigger than that of the breakage portions 46a. Therefore, the front end portions of the side hooks 40b can keep engaging with the casing member 30 without being broken when the breakage portions 46a are broken.

In the sixth embodiment, as mentioned above, because the expanding direction of the air bag 60 is firstly determined to the opposite direction relative to the back end 41 so that the air bag 60 expands passing through the space between front walls of the casing member 30 and the cover member 40. Accordingly, the air bag 60 can expand forward relative to the casing C quickly and smoothly, between the right side wall 11 of the backrest 10a and the door pillar 20c. In addition, the cover member 40 can easily tear the skin 10b of the backrest 10a, so that the expansion of the air bag 60 further becomes easier. As a result, the air bag 60 can protect the passenger sitting on the driver's seat quickly and appropriately.

Although the number of the front hooks 40a is two in the sixth embodiment, it may be one or more than two. In this case, to open the cover member 40 uniformly, it is desired that each front hook 40a is symmetrically provided on the front wall of the cover member 40. Further, plural side hooks 40b may be formed on each side wall of the cover member 40. Although each side hook 40b is formed on the front portion of the side wall of the cover member 40 in the sixth embodiment, it may be formed on the center portion or on the back portion of the side wall.

Furthermore, the position of each engaging through holes formed in the hooks 40a and 40b is not limited, but needs to correspond to each protrusion 36a formed on the casing member 30. After determining the position of each engaging through hole of the hooks 40a and 40b, the position of each protrusion 36a of the casing member 30 may be determined to correspond to each engaging through hole. Here, the closer to the verge portion of the cover member 40 the engaging through hole 43a is, that is, the closer to the verge portion of the casing member 30 the protrusion 36a, the more secure the fixation between the cover member 40 and the casing member 30 by the hook becomes.

The claws of the front and side hooks 40a and 40b can be inserted into through holes formed in the front wall, and in the right and left side walls of the casing member 30, in place of into the through holes 31c and 31d formed in the bottom wall 31. In this case, the lengths of the front and side hooks 40a and 40b are shortened. Further, the breakage portions 43a and 46a of the front and side hooks 40a and 40b can be formed at the other part of the front and side hooks 40a and 40b with the other shape. For example, they may be formed at the middle portion of the hooks 40a and 40b to have a narrow width, respectively. The material of the casing C is not limited to the elastic synthetic resin material, and it may be made of a thin metallic plate.

Further, the inflator 50 can be installed outside of the casing member 30. The present invention is applied not only to the side protecting type air bag apparatus A but to various air bag apparatuses as well. The air bag apparatus A can be installed at the middle portion of the right side wall 11 of the backrest 10a to be exposed to the outside. Further, the air bag apparatus A can be held within the right side front door 20b in place of within the backrest 10a.

Seventh Embodiment

Figure 46:
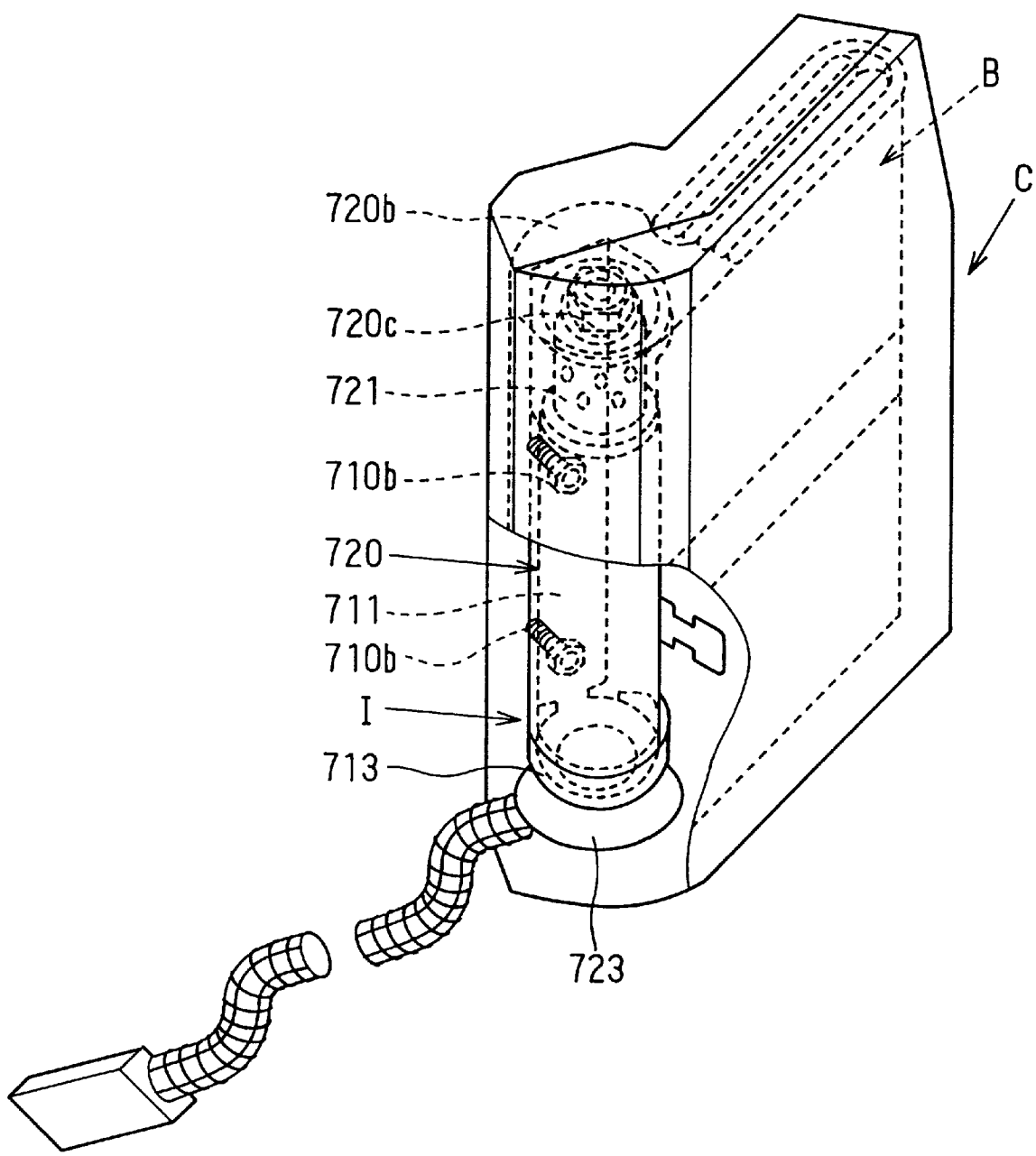
FIG. 46 is perspective view an air bag apparatus for a vehicle in a seventh embodiment according to the present invention.
Figure 47:
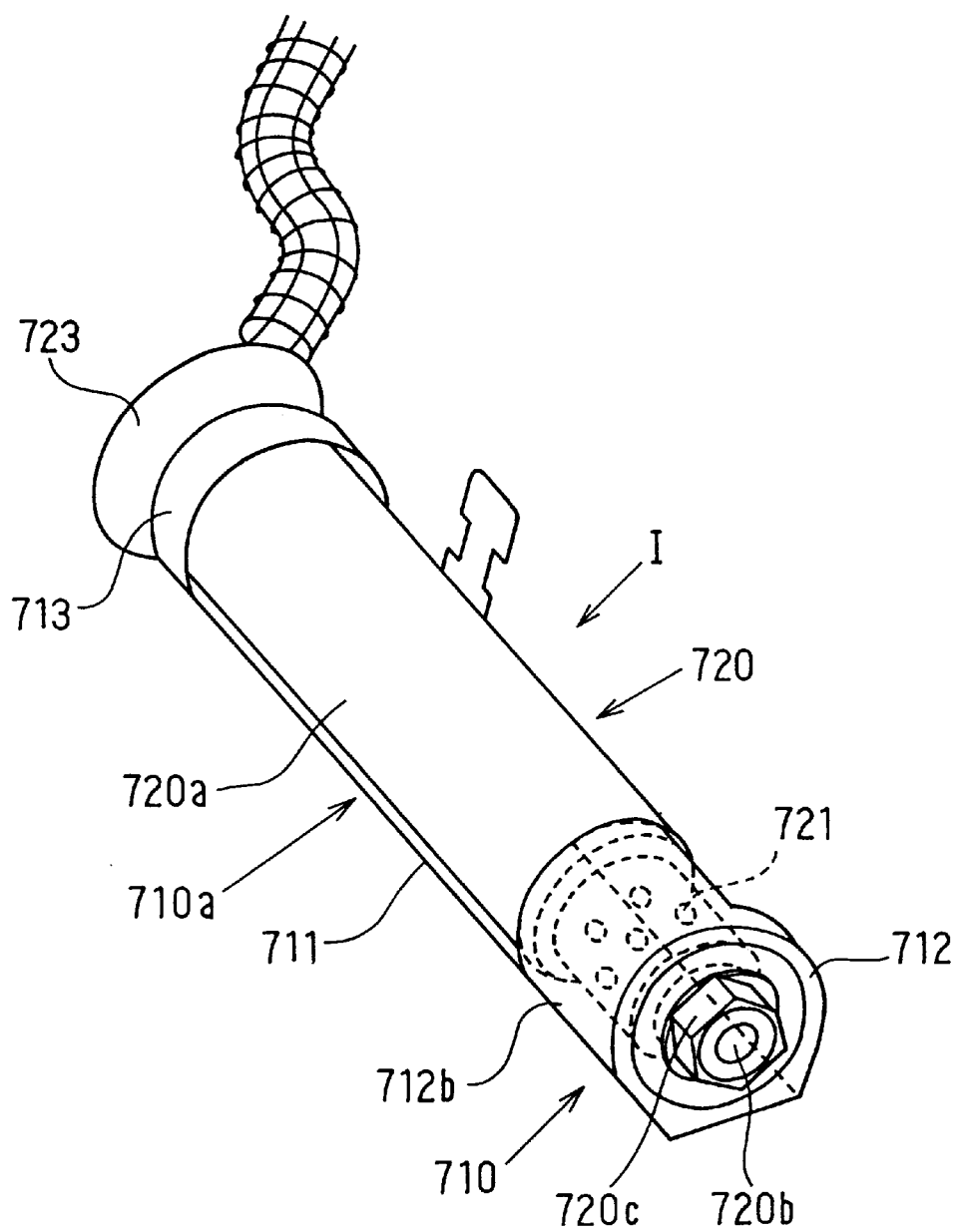
FIG. 47 is a perspective view showing an inflator apparatus for the air bag apparatus in the seventh embodiment.
Figure 48:
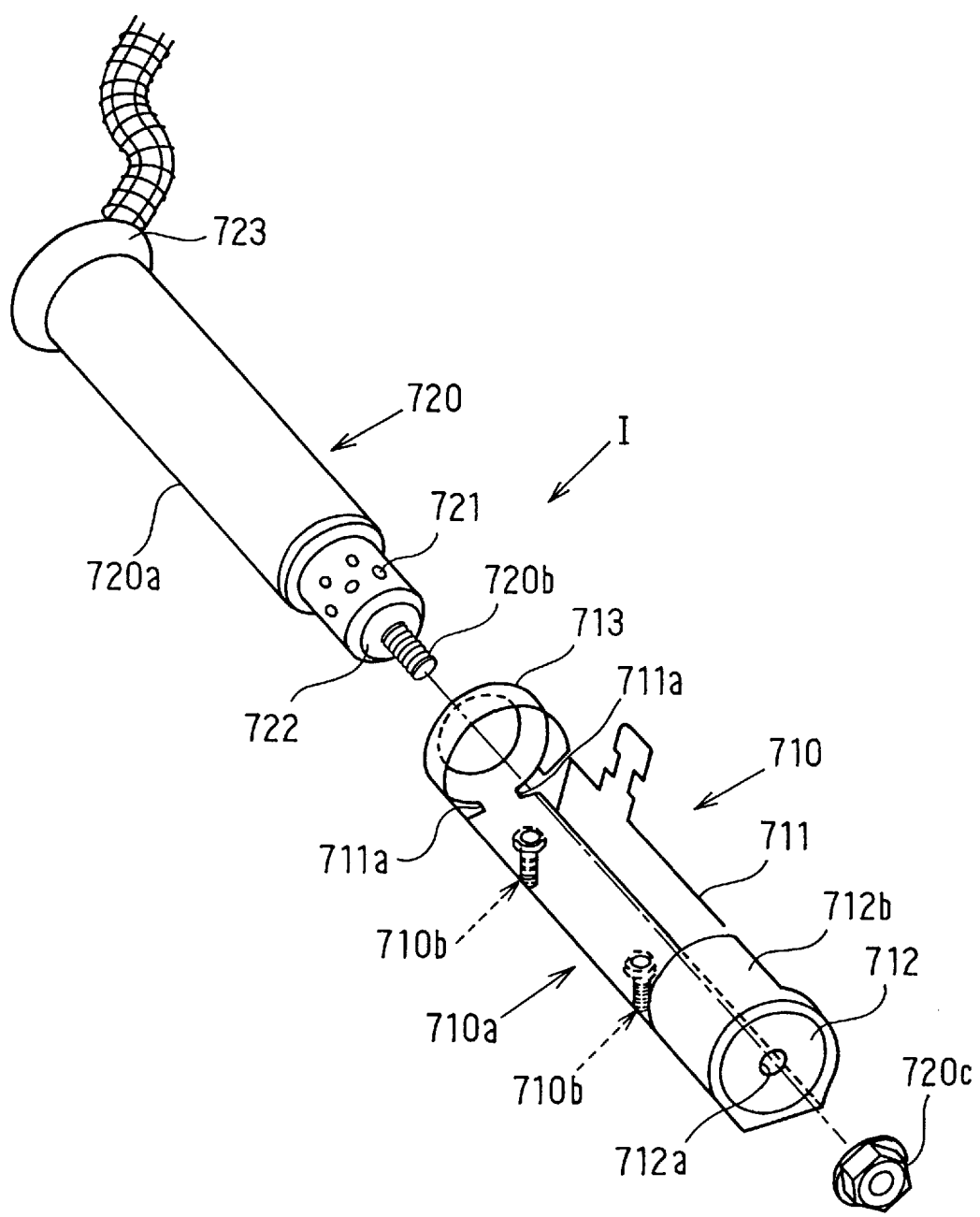
FIG. 48 is a perspective view showing the inflator apparatus.

FIG. 46 shows a side protecting type air bag apparatus in a seventh embodiment according to the present invention. The air bag apparatus includes a hinge-type casing C, an inflator apparatus I, and an air bag B. The inflator apparatus I is held in the air bag B to face an opening of the air bag B, and then, it is installed in the casing C with the air bag B. As shown in FIGS. 47 and 48, the inflator apparatus I has a retainer 710 and an inflator 720.

The retainer 710 is composed of a retainer body 710a, a pair of bolts 710b. Further, the retainer body 710a has a trunk wall 711, a front end wall 712, and a rear end ring-shaped flange 713, which are integrally formed from a metallic plate (refer to FIG. 48). The front end wall 712 is provided at a front end of the trunk wall 711 to be perpendicular to the trunk wall 711, and to have a through hole 712a at the center thereof. Numeral 712b in FIGS. 47 and 48 denotes a cover member having a cylindrical shape and extending from the front end wall 712 toward the ring-shaped flange 713.

Figure 49:
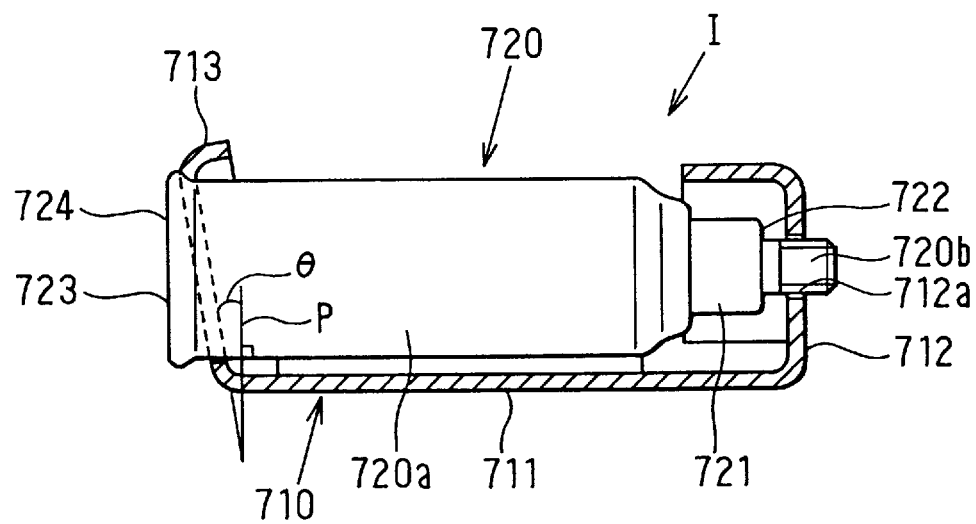
FIGS. 49 and 50 are cross-sectional views for explaining a process of installing an inflator into a retainer.

The ring-shaped flange 713 is provided at a rear end of the trunk wall 711 to be opposite to the front end wall 712, and as shown in FIG. 49, it makes a specific angle Θ with a normal line P of the trunk wall 711 so as to incline in an opposite direction relative to the front end wall 712. As described later, the specific angle Θ is determined in a range so that the ring-shaped flange 713 is moved to be approximately parallel to the front end wall 712 by tightening a bolt 720b and a nut 720c through a washer when the inflator 720 is installed in the retainer 710.

The outer circumferential face of the ring-shaped flange 713 has a shape corresponding to a part of a spherical surface, which is obtained by cutting the spherical surface along surfaces parallel to each other. Here, the diameter of the flange 713 at the rear end thereof is smaller than that at the front end thereof. The flange 713 and the trunk wall 711 is connected through a narrow portion 711a shown in FIG. 51 having recesses so that the flange 713 is easily changed. The center of the ring-shaped flange 713 and the center of the through hole 712a of the front end wall 712 in a diameter direction thereof are positioned on the same straight line parallel to the trunk wall 711. In addition, heads of the pair of the bolts 710b are inserted into through holes formed in the trunk wall 711 and are fixed by press-fitting and caulking, while threaded rod portions of the bolts 710b project outward from the trunk wall 711 for installation.

On the other hand, the inflator 720 is composed of a cylindrical inflator body 720a filled with gas and the beforementioned bolt 720b. The inflator body 720a has a gas exhausting wall portion 721 on an outer circumferential wall at a front end thereof, and a front end wall 722 generally perpendicular to an axis of the inflator body 720a. The bolt 720b coaxially protrudes from the front end wall 722. The inflator body 720a further has a ring-shaped flange 723 coaxially provided at a rear end thereof. The ring-shaped flange 723 extends more outwardly than the outer circumferential wall of the inflator body 720a other than the flange 723 itself.

Figure 50:
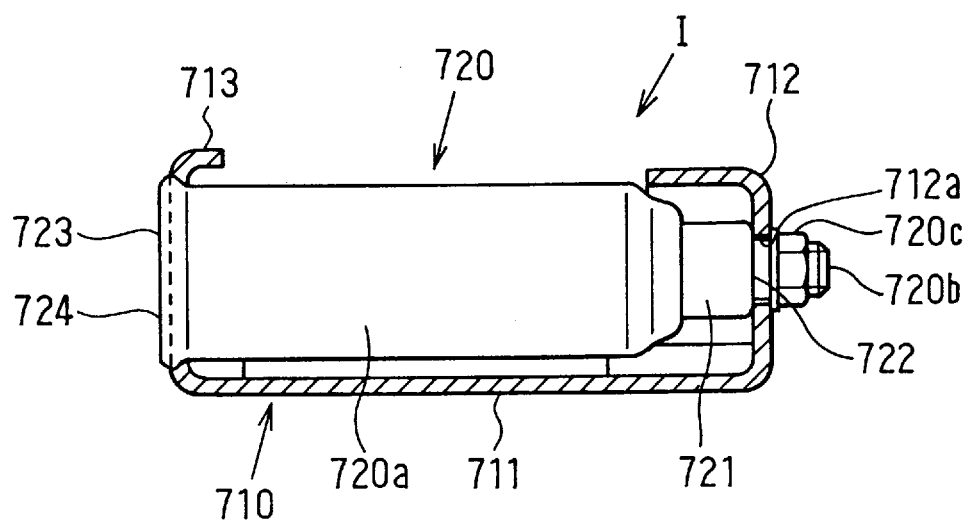

The outer circumferential face of the ring-shaped flange 723 has a shape corresponding to a part of a spherical surface, which is obtained by cutting the spherical surface along surfaces perpendicular to the axial direction of the inflator body 720a. The center of the spherical surface is on the axis of the inflator body 720a. As shown in FIGS. 49 and 50, the closer to the front end of the inflator body 720a the outer circumferential face of the flange 723 becomes, the smaller the diameter of the outer circumferential face of the flange 723 becomes. That is, the diameter of the outer circumferential face of the flange 723 (on a rear end wall 724 of the inflator body 720a in FIG. 49) is the largest in the flange 723. Here, the outside diameter of the inflator body 720 other than the flange 723 is somewhat smaller than the inside diameter of the flange 713 of the retainer 710.

The inflator apparatus I having the above-mentioned constitutions is assembled in the following way. Firstly, as shown in FIG. 48, the inflator 720 is positioned back of the retainer 710 so that the bolt 720b of the inflator 720 faces the flange 713 of the retainer 710. Then, the inflator 720 is inserted into the retainer 710 through the flange 713, whereby the inflator 720 is installed in the retainer 710 in the state shown FIG. 49. In this state, the flange 723 of the inflator 720 abuts to the upper end portion of the flange 713 of the retainer 710 from the outside, while the bolt 720b of the inflator 720 protrudes outside from the through hole 712a of the retainer 710.

Next, as mentioned above, the bolt 720b is fastened with the nut 720c through the washer on the outside of the retainer 710. At this time, by tightening the bolt 720b and the nut 720c, the inflator body 720a is moved toward the front end wall 712 of the retainer 710, so that the flange 713 of the retainer 710 is pushed toward the front end wall 712 by the flange 723 of the inflator 720. Accordingly, the flange 713 is moved to decrease the above-mentioned angle Θ. When the flange 713 becomes approximately perpendicular to the trunk wall 711 of the retainer 710, tightening of the bolt 720b and the nut 720c is stopped.

As a result, the inflator 720 can be securely fixed the retainer 710 in the state shown in FIG. 50. In this case, the narrow portion 711a formed between the trunk wall 711 and the flange 713 makes the deformation of the flange 713 easy. The deformation of the flange 713 occurs by means of plastic deformation or elastic deformation of the narrow portion 711a. In addition, the inflator 720 is coaxially supported by the retainer 710. Therefore, in the case where the angle Θ is determined so that the angle Θ becomes substantially zero when the front end wall 722 of the inflator body 720a abuts to the inside surface of the front end wall 712 of the retainer 710 by tightening the bolt 720b and the nut 720c, the inflator 720 can be securely and coaxially fixed to the retainer 710 without applying bending stress to the bolt 720b. The flange 723 of the inflator 720 can uniformly join to the flange 713 of the retainer 710, and simultaneously, the front end wall 722 of the inflator body 720a can uniformly join to the inside surface of the front end wall 712 of the retainer 710. In this embodiment, it is not necessary to perform an extra process on the inflator 720 and the retainer 710.

Thus assembled inflator apparatus I is accommodated in the casing C with the air bag B, thereby forming the air bag apparatus, and the air bag apparatus is installed in the vehicle. In the installed state, however, there arise the following problems. That is, vibration of the vehicle is likely to be conveyed to the inflator apparatus I so that the inflator apparatus I vibrates. Further, when the inflator 720 injects gas, force caused by the gas injection is applied to the inflator body 720a itself. However, because the inflator 720 is installed in the retainer 710 without applying any stress to the bolt 720b, the bolt 720b is not bent or broken by the above-mentioned vibration or force. As a result, the inflator apparatus I can perform its function appropriately.

Figure 51:
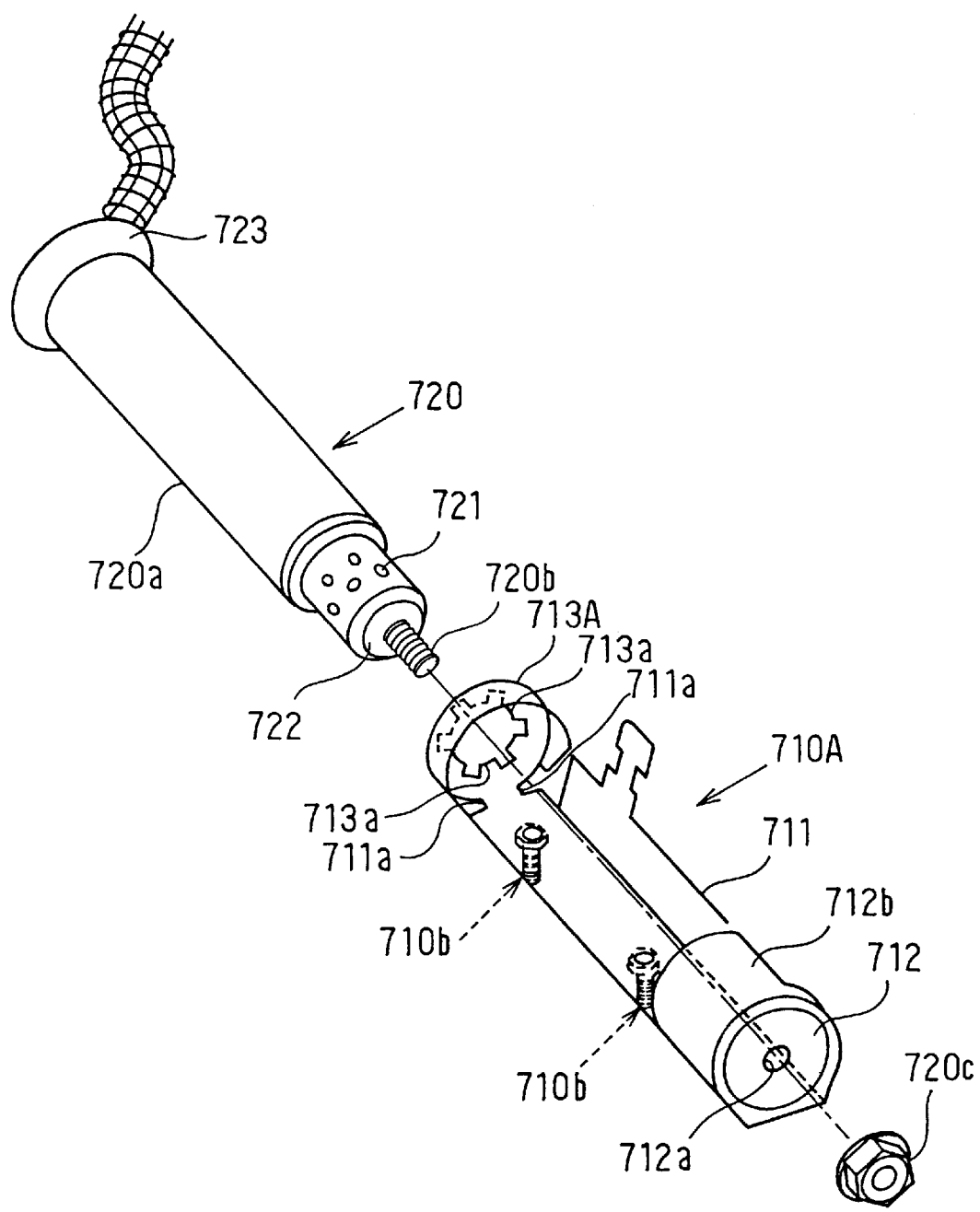
FIG. 51 is a perspective view showing an inflator apparatus in a modified embodiment of the seventh embodiment.

FIG. 51 shows a modified example of to the seventh embodiment. In this modified embodiment, a retainer 710A is adopted in place of the retainer 710. The retainer 710A has a ring-shaped flange 713A connected to the trunk wall 711, in place of the ring-shaped flange 713. The ring-shaped flange 713A has plural projections 713a spaced at uniform intervals on an inner circumferential face at the rear end thereof. The projections 713a project obliquely toward the front end of the flange 713A. The other features are the same as those in the seventh embodiment.

As mentioned above, the inflator 720 is installed in the retainer 710A so that the flange 713A becomes substantially perpendicular to the trunk wall 711 of the retainer 710A. In this state, because the flange 713A has the above-mentioned projections 713a, the projections 713a push the rear end wall 724 of the inflator body 720a toward the front end wall 712, thereby enhancing the secure fixation of the inflator 720 to the retainer 710A. The present invention can be applied to various air bag apparatuses in addition to the side protecting type air bag apparatus.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A method of folding an air bag to be installed in a case of an air bag apparatus, the air bag having a fixed portion to be fixed to the case and a tip portion opposite to the fixed portion in an expanded state, the method comprising the steps of:

folding a first fold-portion of the air bag along a first fold-line approximately parallel to a center line which connects the fixed portion and the tip portion; and folding a second fold-portion including at least the tip portion in the air bag, the first fold portion of which has been folded, along a second fold-line approximately perpendicular to the center line toward the fixed portion.

2. A method of folding an air bag according to claim 1, the method further including the step of;

repeatedly folding the air bag toward the fixed portion along fold-lines approximately parallel to the second fold-line, after folding the second fold-portion.

3. A method of folding an air bag according to claim 1, the method further including the step of;

repeatedly folding the air bag along fold-lines approximately parallel to the second fold-line, in a reverse direction relative to a direction in which the air bag is folded just before, after folding the second fold-portion.

4. A method of folding an air bag according to claim 3, wherein the second fold-portion is repeatedly folded on one face of the air bag to have a bellows-like shape.

5. A method of folding an air bag according to claim 4, wherein the second fold-portion having the bellows-like shape is further folded toward the other face of the air bag.

6. A method of folding an air bag according to claim 1, further including the step of folding a third fold-portion opposite to the first fold-portion, along a third fold-line approximately parallel to the center line.

7. A method of folding an air bag according to claim 6, wherein the third fold-portion is folded not to overlap on the first fold-portion.

8. A method of folding an air bag according to claim 7, wherein one of the first and third fold-portions are folded inside of the air bag.

9. A method of folding an air bag according to claim 7, wherein the second fold-portion is folded inside of the air bag.

10. A method of folding an air bag according to claim 9, further including the step of folding a fourth fold-portion of the air bag of which the second fold-portion has been folded, toward the fixed portion along a fourth fold-line approximately perpendicular to the center line.

11. A method of folding an air bag according to claim 10, wherein the fourth fold-portion is repeatedly folded to have a bellows-like shape on one face of the air bag.

12. A method of folding an air bag according to claim 11, wherein the fourth fold-portion having the bellows-like shape is further folded toward the other face of the air bag.

13. An air bag to be installed in a case of an air bag apparatus, the air bag including a fixed portion to be fixed to the case and a tip portion opposite to the fixed portion in an expanded state, the air bag comprising:

a first fold-portion folded along a first fold-line approximately parallel to a center line which connects the fixed portion and the tip portion; and a second fold-portion including the tip portion and a part of the first fold-portion which has been folded, the second fold-portion folded along a second fold-line approximately perpendicular to the center line with the part of the first fold-portion.

14. An air bag for an air bag apparatus according to claim 13, wherein the second fold-portion has a bellows-like shape.

15. An air bag for an air bag apparatus according to claim 13, wherein the second fold-portion includes several secondary fold-portions overlapped on each other, and each of the secondary fold-portions has a fold-line generally perpendicular to the center line.

16. An air bag according to claim 13, wherein the first fold-portion is folded inside of the air bag.

17. An air bag according to claim 13, further comprising a third fold-portion including the second fold-portion.

18. An air bag according to claim 13, further comprising a fourth fold-portion opposite to the first fold-portion, folded along a fourth fold-line approximately parallel to the center line.

19. An air bag according to claim 18, wherein the second fold-portion includes a part of the fourth fold-portion which has been folded, and is folded with the part of the fourth fold-portion.

20. An air bag according to claim 13, wherein the case holds an inflator which supplies gas into the air bag from a side of the fixed portion of the air bag so that the air bag expands in a direction approximately parallel to the center line.

21. A method of folding an air bag to be installed in a case for an air bag apparatus, the air bag having a fixed portion to be fixed to the case and a tip portion opposite to the fixed portion, the method comprising the steps of:

folding a first fold-portion of the air bag toward an inside of the air bag, the first fold-portion having a first outer side between the fixed portion and the tip portion; and folding a second fold-portion of the air bag toward the inside of the air bag not to overlap on the first fold-portion, the second fold-portion having a second outer side opposite to the first outer side, between the fixed portion and the tip portion.

22. A method of folding an air bag according to claim 21, wherein the air bag has an upper fabric member and a lower fabric member which are sewed together to form a bag-like shape, and a margin to sew of the upper and lower fabric members is positioned within the air bag.

23. A method of folding an air bag according to claim 21, wherein the first and second fold portions are folded using a first and second fold-lines oblique to a center line which connects the fixed portion and the tip portion.

24. A method of folding an air bag according to claim 23, wherein an angle between the first fold-line and the center line is different from an angle between the second fold-line and the center line.

25. A method of folding an air bag according to claim 24, wherein at least one of the first and second fold-lines crosses the center line.

26. A method of folding an air bag according to claim 21, wherein an area of the first fold portion is different from an area of the second fold portion.

27. A method of folding an air bag according to claim 23, further comprising;

folding a third fold-portion toward an outer surface of the air bag, using a third fold-line crossing the center line approximately at right angles and approximately at middle portion of the center line.

28. A method of folding an air bag to be installed in a case of an air bag apparatus, the air bag having a fixed portion to be connected to the case and a tip portion opposite to the fixed portion, the method comprising the steps of:

joining a first and second fabric members to form an bag-like shape, thereby forming the air bag having a margin at an outer circumference thereof;

fixing a first and second sides on the margin of the air bag, the first and second sides positioning opposite to each other between the fixed portion and the tip portion of the air bag; and turning the air bag inside out so that the air bag has a first and second fold-portions which are folded toward inside of the air bag by the first and second sides fixed to each other.

29. An air bag to be installed in a case of an air bag apparatus, the air bag having a fixed portion to be fixed to the case and a tip portion opposite to the fixed portion, the air bag comprising:

a first fold-portion having a first outer side between the fixed portion and the tip portion, and folded inside of the air bag; and a second fold-portion having a second outer side opposite to the first outer side between the fixed portion and the tip portion, and folded inside of the air bag not to overlap on the first fold-portion.

30. An air bag according to claim 29, wherein the air bag has an upper member and a lower member which are joined together to form a bag-like shape, and a margin to join of the upper and lower members is positioned within the air bag.

31. An air bag according to claim 29, wherein the first and second fold portions have a first and second fold-lines oblique to a center line which connects the fixed portion and the tip portion, respectively.

32. An air bag according to claim 29, wherein an area of the first fold portion is different from an area of the second fold portion.

33. An air bag according to claim 31, further including a third fold-portion folded toward an outer surface of the air bag along a third fold-line crossing the center line approximately at right angles and approximately at middle point of the center line.

34. An air bag according to claim 29, further including a fourth fold-portion folded toward an outer surface of the air bag, the fourth fold-portion having a bellows-like shape with several fold-lines perpendicular to the center line.

35. An air bag according to claim 29, wherein the case holds an inflator which supplies gas into the air bag so that the air bag expands approximately in parallel with the center line.

36. An air bag apparatus for a vehicle, comprising:

an inflator for generating gas;

a retainer for supporting the inflator;

an air bag having a connected portion to be connected to the inflator, a tip portion opposite to the connected portion in an expanded state, a first fold-portion folded along a first fold-line approximately parallel to a center line which connects the connected portion and the tip portion, and a second fold-portion including the tip portion and a part of the first fold-portion which has been folded and folded along a second fold-line approximately perpendicular to the center line; and a case for holding the air bag, the inflator, and the retainer.

37. An air bag apparatus according to claim 36, wherein:

the case includes a casing member having a box-like shape and a cover member for covering the casing member;

a first end of the cover member is connected to the casing member;

a second end of the cover member is engaged with the casing member so that the air bag expands to detach the second end of the cover member from the casing member when the gas is supplied to the air bag; and a thickness of the cover member is thinner than that of the casing member.

38. An air bag apparatus according to claim 36, wherein:

the case includes a casing member having a box-like shape with an opening from which the air bag protrudes, and a cover member for covering the opening of the casing member; and a depth of the casing member is deeper than that of the cover member.

39. An air bag apparatus according to claim 36, wherein:

the case includes a casing member having an opening from which the air bag protrudes and a bottom wall opposite to the opening, and a cover member for covering the opening of the casing member; and in a state where the air bag which has been folded is installed in the casing member covered with the cover member, a center face of the air bag in a direction perpendicular to the opening of the casing member is positioned between the bottom wall and the opening of the casing member.

40. An air bag apparatus according to claim 37, wherein:

the casing member has an inflator holding portion and an air bag holding portion;

the first end of the cover member is connected to the inflator holding portion of the casing member;

the second end of the cover member is engaged with the air bag holding portion of the casing member; and a thickness of the cover member is thinner than that of the air bag holding portion of the casing member.

41. An air bag apparatus according to claim 36, wherein:

the case is composed of a casing member having a side wall and a bottom wall, and a cover member for covering the casing member;

the cover member includes a main wall having a connected portion rotatablly connected to the casing member at an end thereof and an engaged portion at the other end thereof;

the engaged portion of the cover member has a engaged member integrally formed with the main wall of the cover member and protruding to face the side wall of the casing member in an engaged state; and the engaged member has a craw at an end thereof opposite to a main wall side end to be engaged with one of the side wall and the bottom wall of the casing member, and a breakage portion, breakage strength of which is the smallest in the engaged member, between the craw and the main wall side end of the engaged member.

42. An air bag apparatus according to claim 41, wherein one of the side wall and the bottom wall of the casing member has a through hole to be engaged with the craw of the engaged member of the cover member.

43. An air bag apparatus according to claim 41, wherein;

the side wall of the casing member has a projection; and the engaged member of the cover member has a through hole at a position corresponding to the projection of the casing member to be engaged with the projection.

44. An air bag apparatus according to claim 43, wherein; the engaged member has the through hole in the breakage portion thereof.

45. An air bag apparatus according to claim 36, wherein:

the case is composed of a casing member having a first side wall and a bottom wall, and a cover member for covering the casing member;

the cover member includes a main wall having a connected portion rotatablly connected to the casing member at a first side thereof and a first engaged member at a second side thereof opposite to the connected portion;

the first engaged member protrudes to be engaged with one of the first side wall and the bottom wall of the casing member at an front end of the first engaged member, and has a breakage portion, breakage strength of which is the smallest in the first engaged member, between a front end side and a main wall side of the first engaged member.

46. An air bag apparatus according to claim 45, wherein the first engaged member is integrally formed with the main wall of the cover member to protrude approximately perpendicular to the main wall.

47. An air bag apparatus according to claim 45, wherein:

the casing member further has a second side wall;

the main wall of the cover member further has a second engaged member at a third side of the main wall between the first side and the second side; and the second engaged member protrude to be engaged with one of the second side wall and the bottom wall of the casing member at an front end thereof, and has a breakage portion, breakage strength of which is the smallest in the second engaged member, between a front end side and a main wall side of the second engaged member.

48. An air bag apparatus according to claim 47, wherein the breakage strength of the breakage portion of the first engaged member is smaller than that of the second engaged member.

49. An air bag apparatus according to claim 47, wherein;

the first and second side walls of the casing member have a first and second projection, respectively; and the first and second engaged members of the cover member have a first and second through holes, respectively, to be engaged with the first and second projections of the first and second side walls of the casing member.

50. An air bag apparatus according to claim 45, wherein;

the first engaged member has a claw at the front end thereof; and one of the first side wall and the bottom wall of the casing member has a through hole to be engaged with the claw of the first engaged member.

51. An air bag apparatus according to claim 47, wherein;

the second engaged member has a claw at the front end thereof; and one of the second side wall and the bottom wall of the casing member has a through hole to be engaged with the claw of the second engaged member.

52. An air bag apparatus according to claim 49, wherein the first and second through holes of the first and second engaged members of the cover member are formed in the breakage portions of the first and second engaged members, respectively.

53. An air bag apparatus according to claim 47, wherein:

the casing member further has a third side wall opposite to the second side wall thereof;

the main wall of the cover member further has a third engaged member at a fourth side opposite to the third side thereof; and the third engaged member protrudes to be engaged with one of the third side wall and the bottom wall of the casing member at an front end of the third engaged member, and has a breakage portion, breakage strength of which is the smallest in the third engaged member, between a front end side and a main wall side of the third engaged member.

54. An air bag apparatus according to claim 53, wherein the breakage strength of the first engaged member is smaller than that of the third engaged member.

55. An air bag apparatus according to claim 54, wherein the air bag breaks the breakage portion of the first engaged member before breaking the breakage portions of the second and third engaged members, thereby expanding in a specific direction.

56. An air bag apparatus according to claim 36, wherein:

the retainer has a first end wall having a through hole, a ring-shaped second end wall having a through hole opposite to the first end wall, and a trunk wall connecting the first and second end walls, the first end wall formed approximately perpendicularly to the trunk wall, the second end wall formed to incline relative to the trunk wall toward a direction opposite to the first end wall;

the inflator has a cylindrically shaped inflator body and a bolt, the inflator body having an end face at an end in an axial direction thereof and a flange at the other end thereof, the bolt protruding from the end face of the inflator body in the axial direction of the inflator body; and in a state where the inflator is installed in the retainer, the bolt of the inflator protrudes from the through hole of the first end wall of the retainer to be fastened with a nut, and the flange of the inflator pushes the second end wall of the retainer so that the second end wall of the retainer is generally parallel to the first end wall of the retainer.

57. An air bag apparatus according to claim 56, wherein;

the ring-shaped second end wall of the retainer has plural projections on a ring-shaped inner circumferential face thereof; and the projections projects toward the first end wall of the retainer obliquely relative to the second end wall.

58. A method of assembling an air bag apparatus having an inflator, a retainer, an air bag having a generally square shape and an opening at a first outer side thereof, and a case, the method comprising the steps of:

installing the inflator into the retainer;

installing the inflator and the retainer into the air bag;

folding a first fold-portion of the air bag along a first fold-line approximately parallel to an expanding direction of the air bag;

folding a second fold-portion of the air bag with a second outer side opposite to the first outer side toward the first outer side along a second fold-line approximately perpendicular to the expanding direction; and installing the air bag, inflator, and the retainer into the case.

59. A method of assembling an air bag apparatus according to claim 58, wherein;

the retainer has a first end wall having a through hole, a ring-shaped second end wall opposite to the first end wall and a trunk wall connecting the first and second end walls, the first end wall formed approximately perpendicularly relative to the trunk wall, the second end wall formed to incline relative to the trunk wall toward a direction opposite to the first end wall;

the inflator has a cylindrically shaped inflator body and a bolt, the inflator body having an end face at an end in an axial direction thereof and a flange at the other end thereof, the bolt protruding from the end face of the inflator body in the axial direction of the inflator body;

the step of installing the inflator into the retainer includes inserting the inflator into the retainer through the through hole of the second end wall of the retainer so that the bolt of the inflator is inserted into the through hole of the first end wall of the retainer and the flange of the inflator abuts to the second end wall of the retainer at an outside of the retainer; and fastening the bolt projecting from the through hole of the retainer with a nut so that the inflator is moved toward the first end wall of the retainer, whereby the flange of the inflator pushes the second end wall of the retainer so that the second end wall of the retainer becomes approximately parallel to the first end wall of the retainer.

60. A method of assembling an air bag apparatus according to claim 59, wherein;

the ring-shaped second end wall of the retainer has plural projections on a ring-shaped inner circumferential face thereof; and the projections projects toward the first end wall of the retainer obliquely relative to the second end wall.

* * * * *